United States Patent
Binyamin et al.

(10) Patent No.: US 10,063,430 B2
(45) Date of Patent: Aug. 28, 2018

(54) SYSTEMS AND METHODS FOR WORKSPACE INTERACTION WITH CLOUD-BASED APPLICATIONS

(75) Inventors: Shuki Binyamin, Palo Alto, CA (US); Jay Zaveri, Campbell, CA (US); Meir Morgenstern, Tel Aviv (IL); Milind Gadekar, Palo Alto, CA (US)

(73) Assignee: CLOUDON LTD., Herzliya (IL)

( * ) Notice: Subject to any disclaimer, the term of this patent is extended or adjusted under 35 U.S.C. 154(b) by 48 days.

(21) Appl. No.: 13/607,601

(22) Filed: Sep. 7, 2012

(65) Prior Publication Data

US 2013/0138810 A1    May 30, 2013

Related U.S. Application Data

(60) Provisional application No. 61/533,135, filed on Sep. 9, 2011.

(51) Int. Cl.
| G06F 15/173 | (2006.01) |
| H04L 12/24 | (2006.01) |
| G06F 9/50 | (2006.01) |

(52) U.S. Cl.
CPC ............ H04L 41/50 (2013.01); G06F 9/5072 (2013.01)

(58) Field of Classification Search
CPC .......................... H04L 12/4641; H04L 12/66
USPC ........................................................ 709/225
See application file for complete search history.

(56) References Cited

U.S. PATENT DOCUMENTS

| 7,676,549 B2 | 3/2010 | McKeon et al. |
| 2007/0180449 A1 | 8/2007 | Croft et al. |
| 2007/0271428 A1 | 11/2007 | Atluri |
| 2008/0183641 A1* | 7/2008 | Tang ................... G06F 9/45537 705/418 |
| 2009/0172557 A1 | 7/2009 | Muta |
| 2009/0182778 A1 | 7/2009 | Tormasov |
| 2009/0183182 A1* | 7/2009 | Parthasarathy ..... G06F 9/44568 719/321 |

(Continued)

FOREIGN PATENT DOCUMENTS

| WO | WO 2013/036920 | 3/2013 |
| WO | WO 2013/036959 | 3/2013 |

(Continued)

OTHER PUBLICATIONS

International Application No. PCT/IB13/03131, International Search Report and Written Opinion dated May 21, 2014.

(Continued)

*Primary Examiner* — Anthony Mejia
*Assistant Examiner* — Emad Siddiqi
(74) *Attorney, Agent, or Firm* — DLA Piper LLP US

(57) ABSTRACT

Various systems and methods described herein relate to server-based computing, where the systems and methods provide a client with access to an application executing remotely from the client device and having access to data (e.g., one or more files) residing on a cloud-based storage (e.g., provided by a third-party cloud-based storage service, such as Dropbox, Box, or Google® Docs). For some systems and methods, the application may be remotely executed and provided to the client such that the application has in-application/embedded access (hereafter, referred to as "native access") to the cloud-based storage and files residing on the cloud-based storage.

26 Claims, 14 Drawing Sheets

(56) References Cited

U.S. PATENT DOCUMENTS

| | | |
|---|---|---|
| 2010/0011301 A1 | 1/2010 | Binyamin |
| 2010/0031203 A1 | 2/2010 | Morris et al. |
| 2010/0211920 A1 | 8/2010 | Westerman et al. |
| 2010/0235830 A1 | 9/2010 | Shukla et al. |
| 2010/0259491 A1* | 10/2010 | Rajamani .......... H04M 1/72527 345/173 |
| 2010/0269048 A1 | 10/2010 | Pahlavan et al. |
| 2010/0269152 A1 | 10/2010 | Pahlavan et al. |
| 2010/0306682 A1 | 12/2010 | Williamson |
| 2011/0184993 A1 | 7/2011 | Chawla |
| 2011/0202837 A1 | 8/2011 | Fong et al. |
| 2011/0246904 A1 | 10/2011 | Pinto et al. |
| 2011/0265164 A1 | 10/2011 | Lucovsky |
| 2012/0096365 A1* | 4/2012 | Wilkinson .............. G06F 9/468 715/740 |
| 2012/0166516 A1* | 6/2012 | Simmons .......... G06F 17/30233 709/202 |
| 2012/0167044 A1* | 6/2012 | Fortier .................... G06F 9/455 717/121 |
| 2012/0226742 A1 | 9/2012 | Momchilov et al. |
| 2012/0327009 A1 | 12/2012 | Fleizach |
| 2013/0219322 A1 | 8/2013 | Cranfill et al. |

FOREIGN PATENT DOCUMENTS

| | | |
|---|---|---|
| WO | WO 2014/064535 | 5/2014 |
| WO | WO 2014/076581 | 5/2014 |

OTHER PUBLICATIONS

International Application No. PCT/IB13/03035, International Search Report and Written Opinion dated Jun. 18, 2014.
International Application No. PCT/US2012/054509, International Search Report and Written Opinion dated Nov. 20, 2012.
International Application No. PCT/US2012/054440, International Search Report and Written Opinion dated Nov. 27, 2012.
Miller, Michael, "Googlepedia: The Ultimate Google Resource," Third Edition, Que Publishing, pp. 276 and 283, Oct. 29, 2008.
Vaughan-Nichols, Steven J., "Dropbox and Google Docs Integration may be on its way," ZDNet, Jan. 16, 2011 [retrieved from http://www.zdnet.com/blog/networking/dropbox-and-google-docs-integration-may-be-on-its-way/564 on Aug. 1, 2014].
Box.net Makes Viewing Files Online Easier by Christina Warren, Mashable, http://mashable.com/2010/01/21/box-integrated-file-viewer/#1OLwgVVeNOqM, Jan. 21, 2010.

* cited by examiner

SYSTEMS AND METHODS FOR WORKSPACE INTERACTION WITH CLOUD-BASED APPLICATIONS

CROSS-REFERENCE TO RELATED APPLICATIONS

The present application claims benefit of U.S. Provisional Patent Application No. 61/533,135 filed Sep. 9, 2011, and entitled "Systems and Methods for Workspace and Gesture Interaction with Cloud-Based Enterprise Applications," which is incorporated by reference herein.

BACKGROUND

1. Technical Field

The present invention(s) generally relate to server-based computing and, more particularly, relate to providing a client with workspace interaction with cloud-based applications.

2. Description of Related Art

In a server-based computing environment, hardware upgrades, application deployment, technical support, and/or data storage can be provided by one or more terminal application servers. As such, use of server-based computing to support multiple clients can reduce application costs and ensure that applications are accessible by some or all of the supported clients. Server-based computing also provides enhanced security and eliminates the need for patch through software upgrades to a plurality of different clients. Traditionally, server-based computing has been implemented by way of remote desktop computing or remote application computing.

With remote desktop computing, one or more terminal application servers provide one or more clients with access to a plurality of software applications, and manage data transfers to each client through a separate data communication line. Generally, users access the terminal server through their end user devices (also known as "clients" or "client devices") by authenticating into a network with a username and password, with an access card, based on biometric information, or by any other authentication method. Upon establishing a remote desktop computing session, each client serves as a remote desktop display capable of displaying applications which are provided by the terminal application server. The remote desktop is created by and handled within the terminal application server based on applications installed on the terminal application server. The clients also allow users to input data through a mouse, keyboard, or the like, such that the users can interact with the application provided by the terminal application server.

Unfortunately, traditional remote desktop computing is limited by the inability of the terminal server to provide access to disparate operating systems (e.g., a traditional terminal server configured to provide Microsoft® Windows® operating system is not capable of providing Apple® OS X®-operating system), thereby requiring a user of remote desktop computing to interface with different terminal servers for access to different operating systems. Traditional remote desktop computing is also limited by the inability of the terminal server to provide the operating system with embedded access to a third-party, cloud-based storage (e.g., those provided by Dropbox, Box, or Google® Docs).

In remote application computing, a plurality of terminal application servers are used, each of which is dedicated to one or more applications. A user can use a remote client to authenticate through a network and access the terminal application server corresponding to a desired application. A single communication line is established between the client and the terminal application server for each application which is provided to the user.

Unfortunately, like remote desktop computing, traditional remote application computing also suffers from various limitations, such as requiring a data communication channel for each provided application, resulting in a need for excessive bandwidth. This is particularly true when traditional remote application computing is utilized to provide access to two or more applications developed to run on different operating system (e.g., a traditional terminal application server configured to serve Microsoft® Windows®-compatible applications is not capable of providing Apple® OS X®-compatible applications). Consequently, users of traditional remote application computing access applications of differing operating system compatibilities with separate connections to disparate traditional terminal application servers, each configured to operate a different operating system. This also results in excessive bandwidth usage, as each connection requires a separate data communication channel. Furthermore, traditional remote application computing lacks the ability to provide applications with embedded/in-application access to files located on third-party, cloud-based storage.

SUMMARY

Various systems and methods described herein relate to server-based computing, where the systems and methods provide a client with access to an application executing remotely from the client device and having access to data (e.g., one or more files) residing on a cloud-based storage (e.g., provided by a third-party cloud-based storage service, such as Dropbox, Box, or Google® Docs). For some systems and methods, the application may be remotely executed and provided to the client such that the application has in-application/embedded access (hereafter, referred to as "native access") to the cloud-based storage and files residing on the cloud-based storage. Depending on the embodiment, the application may be provided with native access to one or more third-party, cloud-based storage services. Accordingly, a third-party user account may be used in establishing native access to such cloud-based storage services. Generally, the third-party user account may be one that would otherwise be unrelated to the user accessing an application but for the systems and methods described herein.

According to some embodiments, a system is provided comprising a storage module, an application module, a virtualization module, and a presentation module. The storage module may be configured to establish access to a cloud-based storage provided by a first cloud-based server over a network, the cloud-based storage comprising a file. The cloud-based storage may be provided by a third-party cloud-based server (e.g., maintained by a storage provider). The application module may be configured to obtain a version of an application (e.g., word processing, spreadsheet, slide presentation, or image editing application) from a second cloud-based server. In some embodiments, the second cloud-based server and the first cloud-based server may be one in the same. In particular, the application module may be configured to provide the version of the application from a third-party cloud-based server (e.g., maintained by an application provider). Generally, the version of application provided/obtained may be one which is not natively operable on the end-user device (e.g., where the application is natively incompatible with the operating system of the end-user device, such as the native incapability that exists between an application configured to operate on Microsoft® Windows® operating system and the Apple® iOS operating system) or one which requires more computing resources to operate than is available on the end-user device (e.g., a tablet end-user device which generally lacks the computing resources to operate a processor-intensive application, such as a computer graphics image [CGI] animation rendering application).

The virtualization module may be configured to execute a virtualized application instance based on the version of the application in a virtual computing environment on a third cloud-based server, where the virtualized application instance has access to the file on the cloud-based storage through the storage module. Additionally, the virtualized application instance may be configured to interact with the first cloud-based server (e.g., the cloud-based storage) in response to a command from a native user application at a first remote client device, where the native user application is native to an operating system of the remote client device. For some embodiments, the virtualization module may be configured to map access of the cloud-based storage from the storage module to the virtual computing environment, thereby providing the virtual application instance access to the cloud-based storage. In addition, in some embodiments, each user on the remote the remote client device is provided with a separate application instance. For instance, the virtualization module may further be configured to generate a separate virtualized application instance for each user on the remote client device.

The presentation module may be configured to transmit to the remote client device output data generated as a result of execution of the virtualized application instance. In order to facilitate this, the presentation module of some embodiments may comprise an encoder module configured to encode a video stream based on a display output generated as a result of execution of the virtualized application instance, and a streaming module configured to transmit the video stream to one or more remote client devices. In some embodiments, the encoder module may further be configured to encode an audio stream based on an audio output generated as the result of execution of the virtualized application instance. Additionally, the streaming module may further be configured to transmit the audio stream to at least one of the remote client devices.

In various embodiments, the system may further comprise a peripheral handler module configured to redirect an input data received from a peripheral, coupled to the remote client device, to the virtualized application instance. While redirecting the received input data, the peripheral handler module may translate the input data from a first input type, native to an environment of the remote client device, to a second input type, native to an environment of the virtualized application instance. For some embodiments, the system may further comprise a peripheral handler module configured to redirect an output data received from the virtualized application instance to a peripheral coupled to the remote client device.

In some embodiments, the system may further comprise an access module configured to authenticate a user on the remote client device, and to use a user credential associated with the authenticated user to enable access to the cloud-based storage by the storage module. According to some embodiments, the system may further comprise an access module configured to authenticate a user on the remote client device, and to use a user credential associated with the authenticated user to enable access to the image of the application by the application module.

According to various embodiments, a method is provided, comprising operations described herein. Likewise, embodiments may be implemented as a computer program product comprising computer instruction codes configured to cause the computer system to perform the operations described herein.

Other features and aspects of various embodiments will become apparent from the following detailed description, taken in conjunction with the accompanying drawings, which illustrate, by way of example, the features of such embodiments.

BRIEF DESCRIPTION OF THE DRAWINGS

Various embodiments are described in detail with reference to the following figures. The drawings are provided for purposes of illustration only and merely depict some embodiments. These drawings shall not be considered limiting of the breadth, scope, or applicability of embodiments.

DETAILED DESCRIPTION

Various systems and methods described herein relate to server-based computing, where systems and methods provide a computing device with access to an application that is executing remotely from the computing device and that has access to data (e.g., one or more files) residing on a cloud-based storage (e.g., provided by a third-party cloud-based storage service). For some systems and methods, the application may be remotely executed and provided such that the application accessed by a user has native access to a cloud-based storage, and data (e.g., files) residing on the cloud-based storage. In this way, various embodiments may provide a user on a client device with universal and agnostic access to applications that would otherwise be non-operable on the client device, and permit such applications with universal and/or agnostic access to cloud-based storage services that are otherwise disconnected from, disparate from, or incompatible with the accessed applications. Additionally, some embodiments may permit an original application, natively operating on the client device but incompatible with a particular file (e.g., an e-mail application operating on the client device attempting to open a spreadsheet file otherwise incompatible with e-mail application), to upload the file to a cloud-based storage service, and enable a remotely execution application, provided in accordance with the embodiments, compatible with the file, and capable of accessing the cloud-based storage service, open the file on behalf of the original application.

Those skilled in the art will appreciate accessing a file, as understood herein, can include, for example, creating, deleting, viewing (e.g., opening), or modifying the file and any of content contained therein. Additionally, as understood herein, those skilled in the art will appreciate that accessing an application can include, for instance, starting, stopping, using, or otherwise controlling operation of the application, and may further include modifying the availability of the application (e.g., adding or deleting availability of the application). Any mention of a cloud-based service (e.g., storage, application) within this description will be understood to include, without limitation, services provided by private clouds, public clouds, and hybrid clouds.

Figure 1:
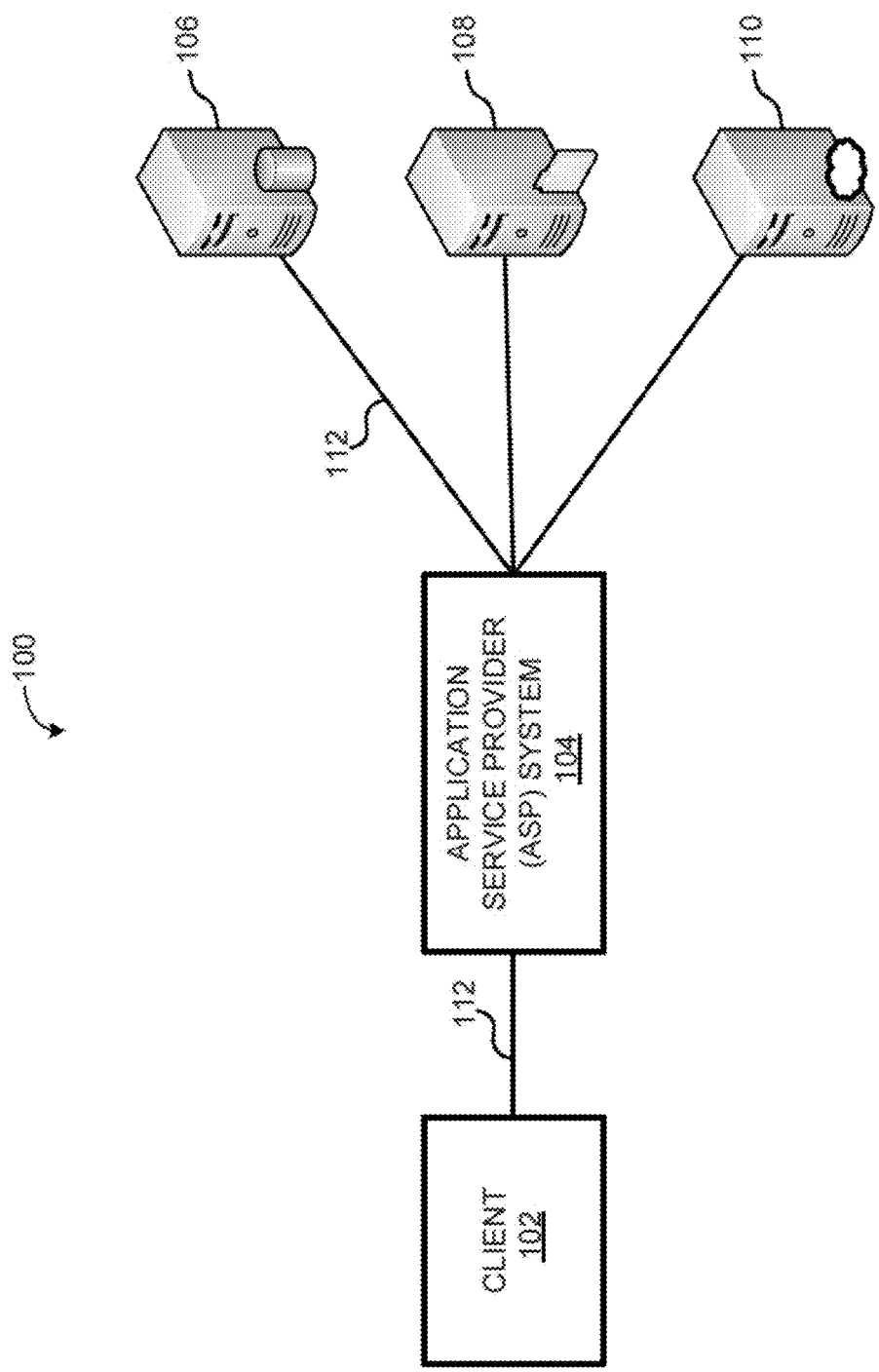
FIG. 1 is a block diagram illustrating an exemplary environment utilizing an exemplary system for providing access to an application (hereafter also referred to as "application access") in accordance with various embodiments.

FIG. 1 is a block diagram illustrating an exemplary environment 100 utilizing an exemplary system for providing access to an application (hereafter also referred to as "application access") in accordance with various embodiments. As shown in FIG. 1, the exemplary environment 100 comprises a client 102, an application service provider (ASP) system 104, a database server 106, a file server 108, and a cloud-based service server 110, each of which may be communicatively coupled with each other using communication connections 112. In some embodiments, the communication connections 112 may be implemented or facilitated using one or more local or wide-area communications networks, such as the Internet, WiFi networks, WiMax networks, and the like. Depending on the embodiments, some or all of the communication connections 112 may utilize encryption (e.g., Secure Sockets Layer [SSL]) to secure information being transferred over the connections 112 between the various entities shown in the exemplary environment 100.

Each of the client 102, the ASP system 104, the database server 106, the file server 108, and the cloud-based service server 110 may be implemented using one or more digital devices, which may be similar to the digital devices discussed later with respect to FIG. 13. For instance, client 102 may be any form of computing device capable of receiving user input (e.g., configured for user interaction), capable of displaying a client user interface (e.g., through which an application can be viewed or controlled), and capable of communicating with the ASP system 104 over one or more of the communication connection(s) 112. Such computing devices may include a mobile phone, a tablet computing device, a laptop, a desktop computer, personal digital assistant, a portable gaming unit, a wired gaming unit, a thin client, a set-top box, a portable multi-media player, or any other type of network accessible user device known to those of skill in the art. Further, one or more of the ASP system 104, the database server 106, the file server 108, or the cloud-based service server 110 may comprise of one or more servers, which may be operating on or implemented using one or more cloud-based services (e.g., System-as-a-Service [SaaS], Platform-as-a-Service [PaaS], or Infrastructure-as-a-Service [IaaS]).

The client 102 may be configured to communicatively connect with the ASP system 104 and be provided with access to an application through the ASP system 104. The application being provided through the ASP system 104 may be executed remotely from the client 102, and/or may be executed on or under the control of the ASP system 104. The ASP system 104 may be executing or controlling the execution of the application on behalf of the client 102 and, as such, may facilitate access (e.g., video, audio, and data access) and user interaction between the executing application and the client 102. The ASP system 104 may further execute or control the execution of the application such that the application has native access (e.g., in-application access) to one or more files residing on a cloud-based storage external to the client 102 and the ASP system 104. In various embodiments, such a cloud-based storage service may be provided by a third-party cloud-based storage service (e.g., Dropbox, Box, or Google® Docs), which is separate and distinct from the ASP system 104. Execution or execution control of the application may further provide the client 102 with the application having native access to databases (e.g., served by the database server 106) or to file servers (e.g., the file server 108) that are separate and distinct from the ASP system 104.

By executing or controlling execution of the application such that the application has access to data separate and distinct from the execution of the application, the ASP system 104 may provide the client 102 with remote access to the application that might otherwise not be operable on the client 102 and that has access to data storage provided by third-party services. In some embodiments, this may also allow an operator of the ASP system 104 to provide user with applications as a remotely accessible service (e.g., for rent) without the need for maintaining long-term storage data on the ASP system 104 (e.g., user data opened in the applications are provided by a storage system and that is distinct from the ASP system 104; the storage system may be maintained by the user or a third-party on behalf of the user).

This may be useful, for example, when the application is incompatible with the operating system running on the client 102, when the client 102 lacks the requisite resources to locally execute the application (e.g., lack of memory space or processor performance), or when the client 102 lacks sufficient resources to properly execute the application locally.

In some instances, the cloud-based storage services accessed by various embodiments may provide additional cloud-based services in conjunction with the storage services. These additional cloud-based services may include such web-application services relating to word processing documents, spreadsheet documents, presentation documents, and the like. An example of such a cloud-based service is Google® Docs. Various embodiments may utilize web-application services, in conjunction with or in place of virtualized applications, when accessing various files through the ASP system 104. Take for instance where a spreadsheet file accessed through the ASP system 104 is stored on a Dropbox. According to certain embodiments, the ASP system 104 may access the spreadsheet file from Dropbox and use a Google® Docs web application to open the spreadsheet file for viewing and/or modification purposes.

Figure 2A:
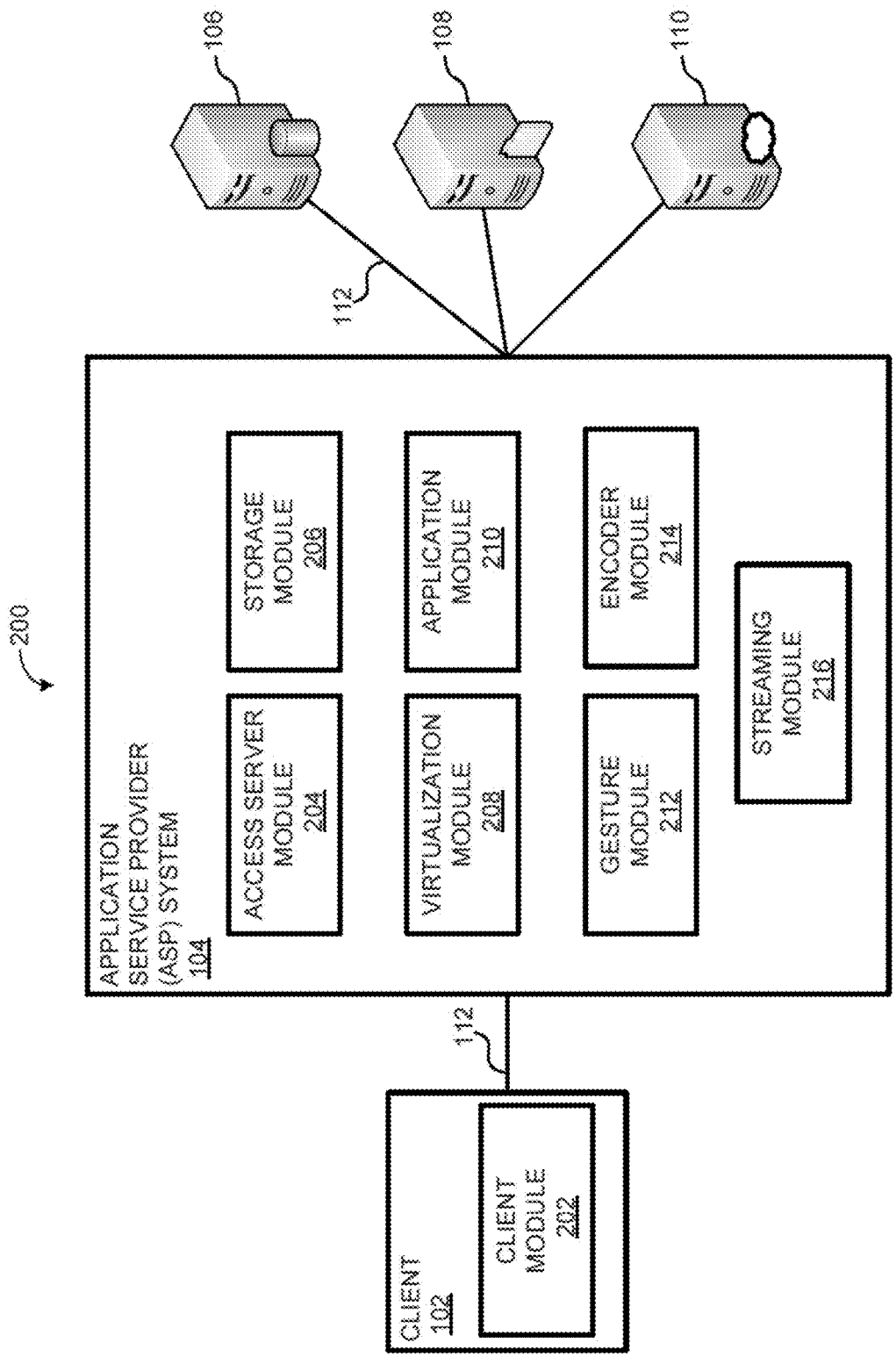
FIG. 2A is a block diagram illustrating an exemplary environment utilizing an exemplary system for providing application access in accordance with various embodiments.

FIG. 2A is a block diagram illustrating an exemplary environment 200 utilizing an exemplary system for providing application access in accordance with various embodiments. In particular, FIG. 2A presents further details regarding the client 102 and the ASP system 104 in accordance with some embodiments. As shown, the client 102 comprises a client module 202. The ASP system 104 comprises an access server module 204, a storage module 206, a virtualization module 208, an application module 210, a gesture module 212, an encoder module 214, and a streaming module 216.

For some embodiments, the client module 202 may be configured to facilitate communication between the client 102 and the ASP system 104, provide a user at the client 102 with a client user interface configured to facilitate user interaction with the ASP system 104, relay user input received through the client user interface (from the user at the client 102) to the ASP system 104, and relay output (e.g., video, audio, or other) from an application provided by the ASP system 104 to one or more components of the client 102 configured to receive and present the output through the client user interface (e.g., video output to the video display of the client 102, and audio data to the sound processor of the client 102).

For some embodiments, the client module 202 may provide the client user interface by generating the client user interface at the client 102 and then presenting the client user interface to a user through a display device (e.g., video display of a tablet computing device) of the client 102. Additionally, some embodiments may provide the client user interface by generating the client user interface at the ASP system 104 (e.g., in the access server module 204), and then sending the generated client user interface from the ASP system 104 (e.g., the access server module 204) to the client module 202 for presentation to the user (e.g., through a display device coupled to the client 102). In general, the presented client user interface is a graphical user interface (GUI) adapted for user interaction through the client 102 and its coupled peripherals, which may include a touch screen. Those skilled in the art will appreciate that the configuration, appearance, and behavior of the client user interface provided by the client module 102 may vary based on, among other things, the type of digital device comprising the client 102 or the computing resources of the client 102 available to the client module 202 (e.g., peripherals available to the client 102, or modes of input available through the client 102).

The client module 202 may further be configured to receive and relay control information from an input device (e.g., peripheral) coupled to the client 102 (e.g., physical or on-screen keyboard integrated into the client 102, or peripheral externally communicatively coupled to the client 102) to the ASP system 104. Likewise, the client module 202 may relay control information, or other data, between devices (communicatively) coupled to the client 102 and the ASP system 104 (e.g., the client module 202 relays print data from the ASP system 104 to a printer coupled to the client 102).

The client module 202 may also be configured to provide a file manager interface at the client 102 operable in presenting one or more files, stored on one or more separate and disparate cloud-based storage services (e.g., third-party services) or stored locally at the client 102, for access through the client 102. For some embodiments, the file manager interface may allow a user at the client 102 to request file management operations with respect to the files presented through the file manager interface, which include files locally stored and/or stored on various cloud-based storage services. The file management operations supported may include adding, deleting, renaming, and moving files stored on one or more cloud-based storage services or locally at the client 102. Files presented through the file manager interface may also be selectable for opening through the ASP system 104 (e.g., in a virtualized application instance accessed through the ASP system 104).

According to some embodiments, when the files from different storage services (e.g., different third-party cloud-based storage services and/or locally stored at the client) are presented, the files may be presented in a segregated manner according to their storage source (e.g., grouped according to storage source), or presented in a common pane with little or no indication of a file's storage source. In some embodiments, when a file presented through the file manager interface is selected for opening, the ASP system 104 may access the file directly from its corresponding storage source (e.g., cloud-based storage service or local file storage at the client) or obtain a cached copy of the file selected its corresponding storage source, and then present the file for access through a virtualized application instance. Where a cached copy of the file is utilized for opening the file, the ASP system 104 may be configured to commit any changes/update performed on the cached copy to the original copy at the original storage location (e.g., commitment occurs when the virtual application instance is closed).

Figure 10:
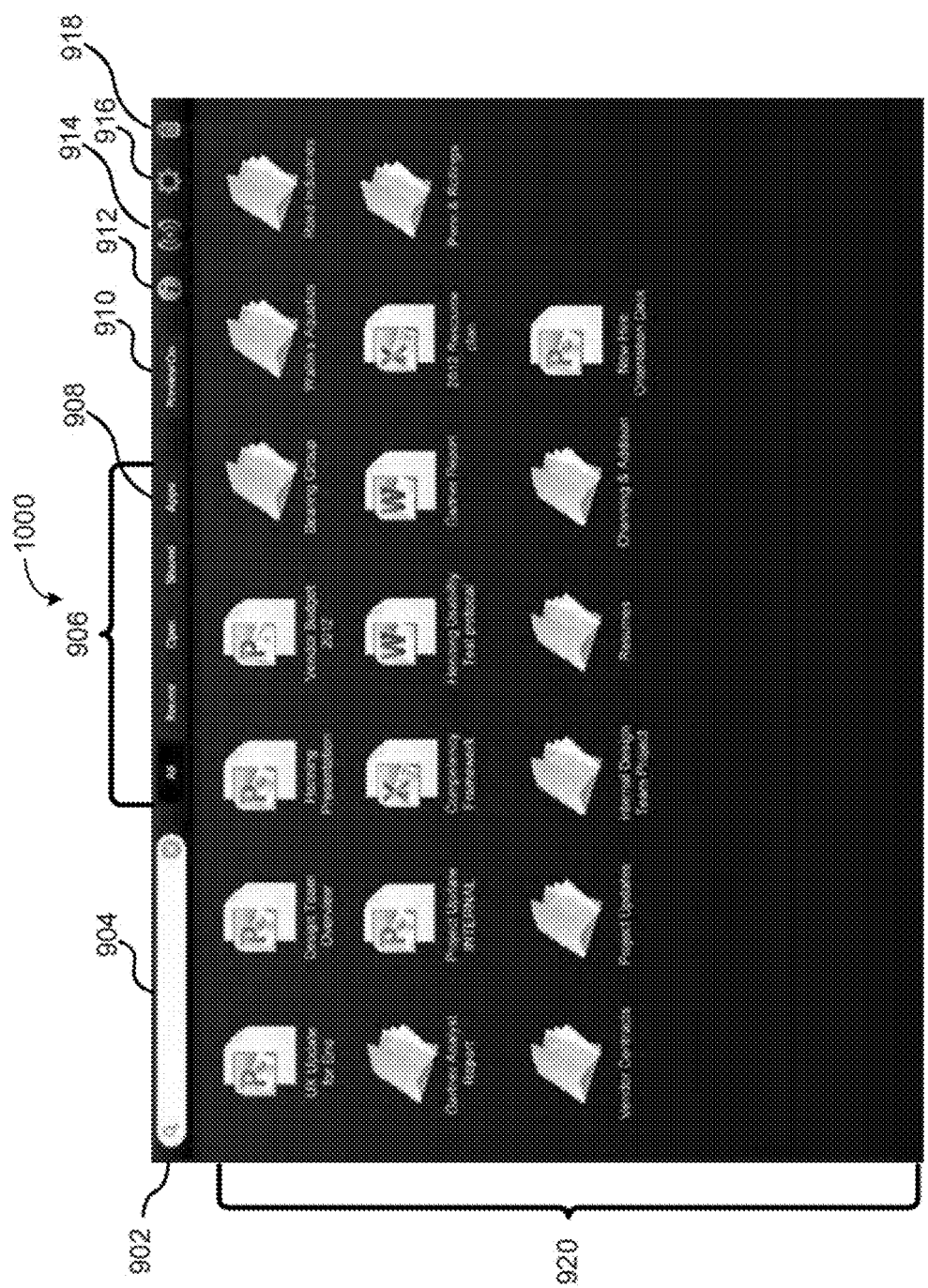

By providing a file manager interface having universal and/or agnostic access to one or more disparate file storage services and/or the local storage source, various embodiments can provide users (e.g., at the client 102) with a universal file workspace, through which files stored in disparate locations can be universally/agnostically accessed for management, viewing, or editing purposes. FIG. 10 presents an exemplary client user interface, according to some embodiments, that includes file manager interface and that could be presented by the client module 202 at client 102.

Continuing with reference to FIG. 2A, the access server module 204 may be configured to facilitate user access to files or applications (e.g., by a user at the client 102) that are provided through the ASP system 104. In some embodiments, the access server module 204 may achieve this by performing some or all of the following on behalf of a user accessing the ASP system 104 from the client 102: (a) establishing and maintaining communication between the client 102 and the ASP system 104; (b) authenticating access to the ASP system 104 (and its various components) by the user; (c) establishing and maintaining one or more application access sessions (also referred to herein as "application sessions") for the user, whereby each application access session may comprise an instance of an application (e.g., an instance of a particular version of an application) being executed or controlled by the ASP system 104 on behalf of the user at the client 102; (d) implementing user preferences and settings for the user's access of the ASP system 104; (e) implementing and enforcing user policy on the user's access of the ASP system 104; (f) enabling access by the applications being executed or controlled by the ASP system 104 to data (e.g., files) stored on or stored using third-party data storage services (e.g., third-party cloud-based storage services, such as Dropbox or Google® Docs); (g) monitoring the user's access of the ASP system 104; (h) maintaining statistics or analytics based on the user's access of the ASP system 104; and (i) facilitating billing of the user based on their access or usage of the ASP system 104.

In some embodiments, the access server module 204 may on behalf of the client 102, negotiate, establish and otherwise facilitate the establishment of a connection between the client module 202 and an application being provided via the virtualization module 208 and the application module 210. Once established, the access server module 204 may continue to monitor or control the connection, possibly in accordance with user preferences, settings, and policies utilized by the ASP system 104.

The access server module 204 may further be configured to manage the overall operation of the ASP system 310 discussed further herein. For example, the access server module 204 may be operable to track and manage resources for the ASP system 104, which may involve monitoring/managing computer resource utilization (e.g., memory utilization, processor utilization, or network bandwidth utilization) by various components of the ASP system 104 or cloud-based services (e.g., SaaS, PaaS, or IaaS) utilized by various components of the ASP system 104. As another example, the access server module 204 may be responsible for distributing the workload of serving two or more clients similar to the client 102 across one or more access servers performing the operations of the access server module 204.

The storage module 206 may be configured to establish and/or maintain access to data on third-party data storage services by an application executing or being controlled by the ASP system 104 on behalf of the user at the client 102. In some embodiments, the storage module 206 may achieve this by receiving, storing, and utilizing access parameters (e.g., third-party access parameters such as protocol information, username, password, encryption key, signature file identifier, navigation address, third-party storage identifier, or the like) provided by the user (at the client 102) in association with a third-party data storage service (e.g., a cloud-based data storage service, such as Dropbox or Google® Docs) which the user wishes to access through the ASP system 104. For example, when the user requests access to data (e.g., files) stored using a third-party data storage service, the storage module 206 may establish a connection with the third-party data storage service using the stored access parameters (e.g., protocol information, username, password, encryption key, signature file identifier, navigation address, third-party storage identifier, or the like) provided by the user, retrieve a listing of the data stored on/using or otherwise made available through the third-party data storage service in association with the access parameters provided, and access the data according to the user's access request. Depending on the embodiment, the user may cause data stored on the third-party data storage service to be accessed by the ASP system 104, for example, when the user requests to review a listing of data (e.g., files) stored on the third-party data storage service or when the user chooses to access data (e.g., open, view, or edit a file) using an application provided by the ASP system 104 (e.g., through the application module 210).

In addition to establishing and/or maintaining access to data on third-party data storage services (e.g., Dropbox, Box, or Google® Docs), the storage module 206 may be configured to permit the ASP system 104 to manage data on the third-party data storage services on behalf of the client 102. For instance, the storage module 206 may permit the ASP system 104 to implement file management functions with respect to files stored on disparate third-party data storage services, thereby enabling a user at the client 102 to perform file management operations through the client module 202. According to some embodiments, the storage module 206 may be operable with the client module 202 such that users can utilize file management functions through a file manager interface (e.g., a file management graphical user interface) presented by the client module 202.

The virtualization module 208 may be configured to establish, monitor, maintain, or otherwise manage execution of an instance of an application in a virtual computing environment (hereafter, also referred to as a "virtualized application instance") for access by the user at the client 102. An instance of the application may be executed in a virtual computing environment in association with an application session established for access by the user at the client 102. Accordingly, in some embodiments, the virtualization module 208 may initiate or manage execution of an instance of the application based on requests received from the access server module 204.

In some embodiments, the instance of an application, which is operated in a virtual computing environment for the benefit of user access, may be based on a particular version of the application. Depending on the embodiment, the version of the application chosen/selected for execution as the application instance may be determined by the access server module 204, the virtualization module 208, the application module 210, or some combination thereof. Factors influencing the determination of the version may include, for the example, the number of user licenses available for a given version of the application, the type of data to be accessed by the application (e.g., file has a format A that is compatible with a version B of the application), the user accessing the application (e.g., user's access privileges or user's subscription type with respect to the ASP system 104), the capabilities of the client device 102 (e.g., the client device 102 is equipped with a high-definition display compatible with the high-definition output of a particular version of an application), the computing resources presently available to the ASP system 104, or network bandwidth required to provide the client 102 with access to the given version of the application. In some embodiments, the virtualization module 208 may utilize an internal hypervisor or interface with an external hypervisor configured to manage execution of the instance of an application in a virtual computing environment. Additionally, the virtualization module may employ the use of a cloud-based services (e.g., SaaS, IaaS, or PaaS), possibly provided by a third-party (e.g., Amazon® EC2®, GoGrid®, or Rackspace®), to execute the instance the instance of an application in the virtual computing environment.

In various embodiments, the virtualization module 208 of the ASP 104 may initiate any number of virtualized application instances. For example, the virtualization module 208 may initiate (e.g., command initiation of) any number of virtualized application instance by the ASP 104 and/or any number of servers (e.g., other ASP systems 104 and/or other servers). In some embodiments, the virtualization module 208 creates and executes a local virtualization environment.

The application module 210 may be configured to obtain or retrieve a version of an application for execution in a virtual computing environment for access by the user at the client 102. For example, the application module 210 retrieves a version of the application on behalf of the virtualization module 208, and then provides the retrieved version to the virtualization module 208 for execution in a virtual computing environment. Depending on the embodiment, the application module 210 may retrieve the version of the application based on a request from the virtualization module 208 or the access server module 204 (e.g., which, as described herein, may be responsible for managing application sessions for the user access). The application module 210 may retrieve the version of the application from an application repository (not shown), which for some embodiments may be implemented using one or more file servers, database servers, or some combination thereof. For example, the version of the application may be retrieved from a cloud-based services configured to serve the version of the application (e.g., to the application module 210) upon request. The application repository may store a variety of versions for a given application (e.g., for Microsoft® Word®, the application repository may store Word® 2011, Word® 2008, Word® 2004, and Word® 2001), and provide the appropriate version of the given application based on the request discussed above. Each version of the application may be stored on the application repository as a single, separate application executable file, as a directory containing the version's associated executable file(s) and any supporting files (e.g., software library files), or as a binary image or compressed file containing the version's associated executable file(s) and any possible supporting files (e.g., software library files), or some combination thereof.

For some embodiments, retrieval of the version of the application may comprise the application module 210 retrieving a path or link to data (e.g., a copy of the application or an image of the application) corresponding to the version of the application to be retrieved. This path or link to the data may then be conveyed by the application module 210 to the virtualization module 208, which uses the data at the path/link to instantiate a virtualized application instance.

For some embodiments, the virtualization module 208 and the application module 210 may be implemented as single module (not shown) that utilizes a cloud-based service (e.g., SaaS, IaaS, or PaaS) to provide a version of an application executing in a virtual computer environment. Such a cloud-based service may be provided by a third-party cloud-based service, which may be manage or controlled by the ASP system 104 using APIs compatible with the service.

To utilize the cloud-based services for the virtualization module 208, the application module 210, and possibly other components of the ASP system 104, the ASP system 104 may employ application programming interfaces (APIs) (e.g., those provided by Amazon®, GoGrid®, or Rackspace®) that permit the ASP system 104 and its various components to provision (e.g., request the use of), consume, and release services provided by cloud-based services. For example, the virtualization module 208 may utilize an Infrastructure-as-a-Service (IaaS) API (e.g., driver) to provision one or more virtual machines to operate one or more virtualized application instances, while the application module 210 the IaaS API to for provisioning virtual machines to store copies/images of applications (utilized by the virtualization module 208 to instantiate virtualized application instances).

In context of an application being provided to the client 102 by the ASP system 104 for user access, the gesture module 212 may be configured to translate or map user input received from the client module 202 (e.g., via the access server module 204) to an alternative user input compatible with the application being provided. In some embodiments, such a translation/mapping may be implemented when the client 102 is incapable of receiving the alternative user input from the user through the one or more input devices available through the client 102 (e.g., the client 102 lacks an input device having a special keyboard buttons compatible with the application being provided). Such functionality may be particularly beneficial where a digital device, such as a mobile phone or a tablet device, that rely on a touch-based input devices (e.g., touch-based screens) and on-screen input devices in place of external input devices. For example, a tablet device capable of receiving touch-based input gestures may have its two-finger or three-finger on-screen swipe gestures translated or mapped to page-up or page-down commands with respect to a word processing application being provided through the ASP system 104.

The encoder module 214 may be configured to receive and encode output data from an application being executed or controlled by the ASP system 104 (e.g., using the virtualization module 208) for access by the user at the client 102. In various embodiments, dependent upon the application being executed/controlled, the output received may comprise video output data, audio output data, or general output data (e.g., file output). Additionally, the video, audio, or data output received by the encoder module 214 may be provided by the virtual computing environment executing a virtualized instance of an application (e.g., at the request of the virtualization module 208). To facilitate the functionality of the encoder module 214, the encoder module 214 may be implemented as a virtual driver (e.g., virtual display driver, or virtual audio driver) employed by the virtual computing environment when producing output from a virtualized application instance operating in the virtual computing environment.

The format in which the output is encoded by the encoder module 214 may depend on the type of output being encoded (e.g., video, audio, or raw data), the preferences or privileges of the user accessing the application (e.g., the user may lack the privilege to receive audio based on the current account type), the resources available to the ASP system 104, the capabilities of the client device 102, and/or the communication bandwidth available between the client 102 and the ASP system 104 (e.g., the client 102 is a mobile phone communicating with the ASP system 104 over a low-speed cellular connection). Further, in some embodiments, the encoder module 214 may be configured (e.g., according to user preferences or system settings) to encrypt the output provided by the application (e.g., for security purposes), and/or compress the output provided by the application being executed/controlled to utilize less communication bandwidth. Those skilled in the art would fully appreciate that any number of known codecs (e.g., H.264 standard codecs, such as Application Distribution Protocol [ADP]), ciphers, or encoding methodologies may be utilized by the encoder module 214 when performing the encoding process in accordance with various embodiments.

The streaming module 216 may be configured to receive the encoded output from the encoder module 214 and transmit the encoded output to the client module 202 as a data stream. For some embodiments, the format utilized for the data stream may vary, for example, according to the communication bandwidth available between the client 102 and the ASP system 104, the types of communication connections being utilized between the client 102 and the ASP system 104, the capabilities of the client device 102, the preferences of the user accessing the application through the ASP system 104, and/or the settings of the ASP system 104. Those skilled in the art will appreciate a number of known communication protocols (e.g., transport protocols, such as User Datagram Protocol [UDP]) or data streaming formats may be utilized by the streaming module 216 as encoded output from the application is streamed to the client module 202. The encoder module 214 may further employ the video encoding techniques described in U.S. patent application Ser. No. 12/301,767 (published as U.S. Patent Application Publication No. 2010/0011301), filed on Nov. 20, 2008, which is hereby incorporated by reference.

In various embodiments, the streaming module 216 may transmit one or more data streams to the client module 202 in order to deliver various types of output being provided by the application being access (e.g., one data stream of audio and a separate data stream for video). Upon receiving the data stream(s) from the streaming module 216, the client module 102 may decode the encoded output received over the data stream, and present the output on the client 102 through the client user interface provided by the client module 202.

Figure 2B:
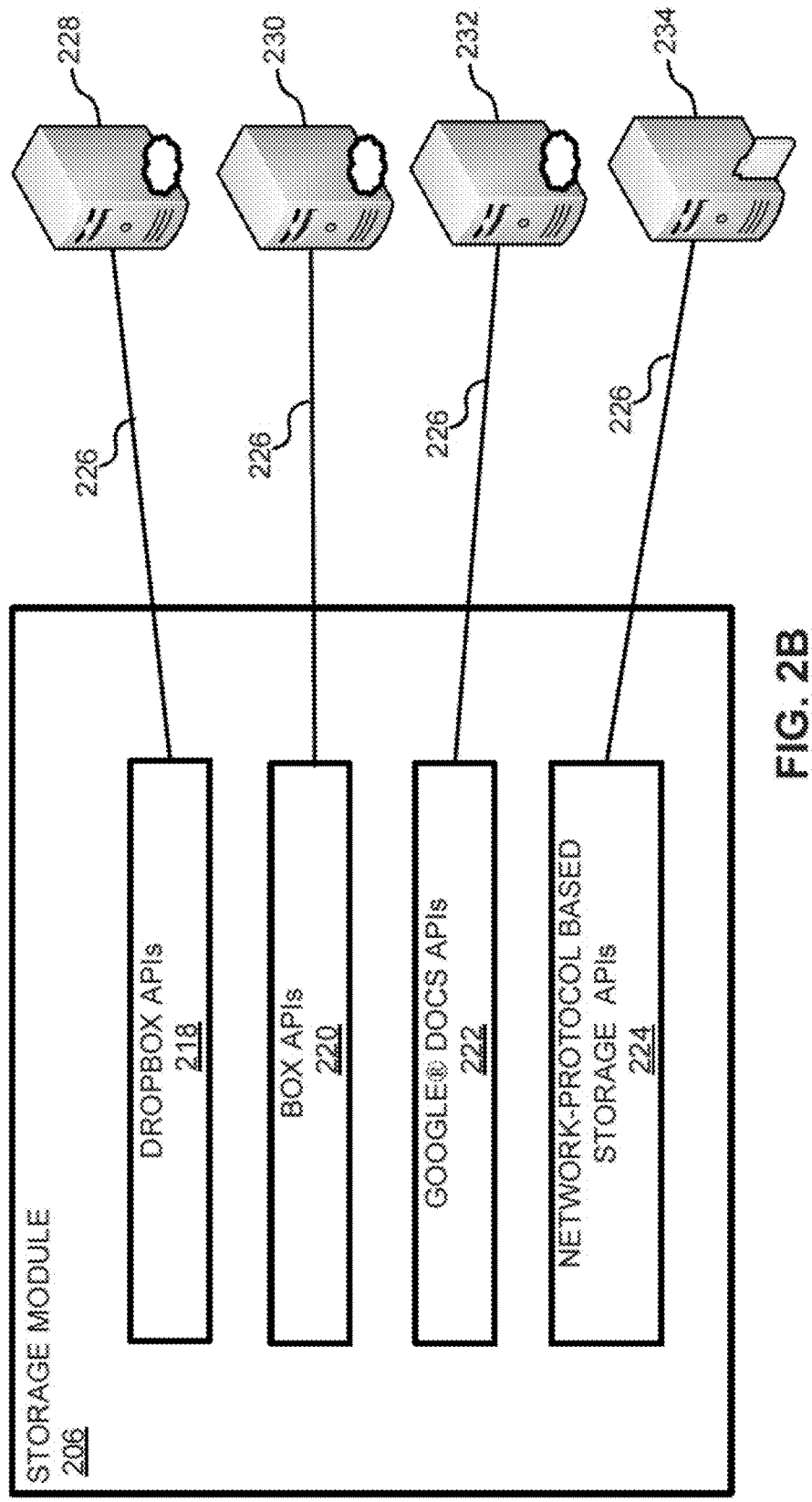
FIG. 2B is a block diagram illustrating an exemplary storage module that is part of an exemplary system for providing application access in accordance with various embodiments.

FIG. 2B is a block diagram illustrating the storage module 206 configured to establish or maintain access to data on third-party data storage services (e.g., Dropbox, Box, or Google® Docs) by an application executing or being controlled by the ASP system 104 on behalf of the user at the client 102. In addition to storing and utilizing access parameters in association with different data storage services (e.g., third-party cloud-based storage), the storage module 206 may comprise various application programming interfaces (APIs) that facilitate access to the different storage services over network connections 226. For example, as illustrated in FIG. 2B, the storage module 206 may comprise Dropbox APIs 218 enabling access data stored at a Dropbox cloud-based storage server 228, Box APIs 220 enabling to access data stored at a Box cloud-based storage server 228, and Google® Docs APIs 222 configured to access data stored at a Google® Docs cloud-based services. In some embodiments, the web APIs utilized by the storage module 206 may comprise web-based APIs (e.g., web application APIs) provided by such third-party cloud service operators as Dropbox and Google® for accessing various cloud-based service, including storage services and file management services.

As also illustrated in FIG. 2B, the storage module 206 may comprise network-protocol based storage APIs that permit access to a network file system 234 using non-web-based methodologies. For certain embodiments, the storage module 206 may utilize the network-protocol based storage APIs to access file system based on various network protocols including, for example, Network File System (NFS), Samba, file transfer protocol (FTP), and the like.

Figure 3:
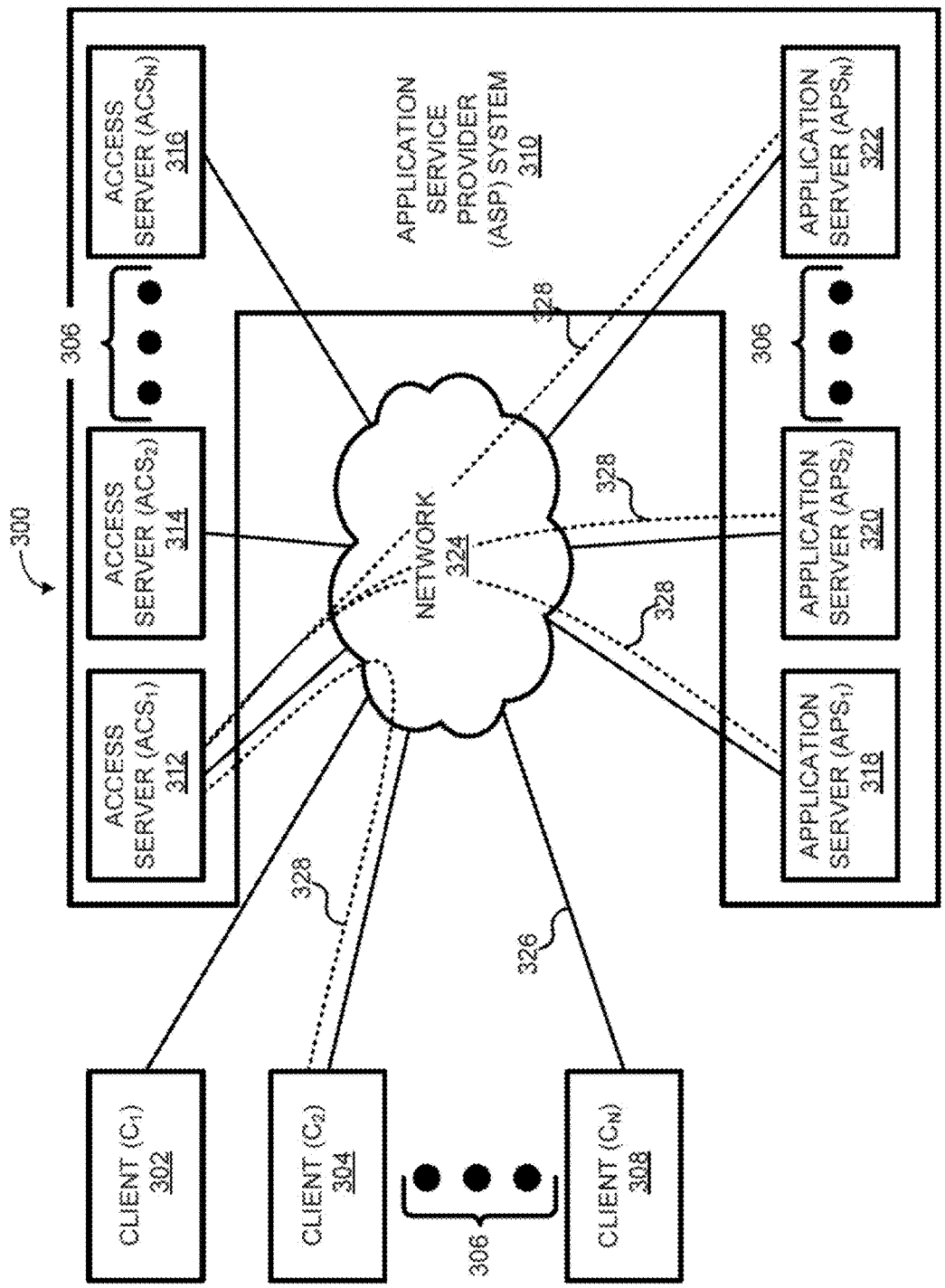
FIG. 3 is a block diagram illustrating an exemplary environment utilizing an exemplary system for providing application access in accordance with various embodiments.

FIG. 3 is a block diagram illustrating an exemplary environment 300 utilizing an exemplary system for providing application access in accordance with various embodiments. As shown, the exemplary environment 300 comprises clients $C_1$ to $C_n$ (represented by clients 302, 304, and 308), an application service provider (ASP) system 310, and a network 324 enabling communication between the clients 302, 304, and 308 and the ASP system 310 over network connections 326. Depending on the embodiment, the clients 312, 314, and 316 may be similar in function and implementation to the client 102, and the ASP system 310 may be similar in function and implementation to the ASP system 104, each of which was discussed in detail with reference to FIGS. 1 and 2. As such, in accordance with various embodiments described herein, the clients 312, 314, and 316 may comprise one or more digital device(s) configured to communicating with the ASP system 310 through the network 324, the ASP system 310 may comprise one or more server configured to provide the clients 312, 314 and 316 with access to files and applications.

As further shown in FIG. 3, the functionality of the ASP system 310 may be implemented by way of access servers $ACS_1$ to $ACS_n$ (represented by access servers [ACSs] 312, 314, and 316), and application servers $APS_1$ to $APS_n$ represented by (application servers [APSs] 318, 320, and 322). Although a limited number of clients, ACSs, and APSs are depicted in FIG. 3, those skilled in the art will appreciate that there may be any number of clients, ACSs, and APSs. Ellipses 306 in FIG. 3 indicate that any number of clients, ACSs, and APSs could be present in the exemplary environment 300.

In some embodiments, the ACSs 312, 314, and 316 may implement some or all of the functionality provided by the access server module 204 as described in reference to FIG. 2A, and the APSs 318, 320, and 322 may implement some or all of the functionality provided by some or all of the storage module 206, the virtualization module 208, the application module 210, the gesture module 212, the encoder module 214, and the streaming module 216 as described in reference to FIG. 2A. Specifically, according to some embodiments, the workload of providing some or all of the services or functionalities of the access server module 204 may be distributed amongst some or all of the ACSs 312, 314, and 316, and the workload of providing, while the workload of providing some or all of the services or functionalities of the storage module 206, the virtualization module 208, the application module 210, the gesture module 212, the encoder module 214, and the streaming module 216 may be distributed amongst some or all of the APSs 318, 320, and 322. In some instances, the ACSs 312, 314, and 316 may utilize load balancing to distribute the workload amongst the available ACSs, and the APSs 318, 320, and 322 may utilize load balancing to distribute the workload amongst the available APSs. In various embodiments, one or more digital devices may manage and/or provide load balancing to any number of ACSs and/or any number of APSs. By distributing the workload amongst multiple ACSs and APSs, certain embodiments may provide acceptable performance (e.g., enough availability of computing resources to provide the requested applications with user-acceptable performance), scalability (e.g., near real-time user scalability according to demand or the number of users currently utilizing the ASP system 310 increases or decreases, or application scalability to provide more variety of applications operating on a variety of operating systems), and reliability (e.g., through redundancy of servers and components, or lower bandwidth per user) with respect to the ASP system 310.

In the example illustrated in FIG. 3, a dashed line 328 illustrates a virtual communication channel (hereafter referred to as "virtual communication channel 328") between the client 304 and the application servers 318, 320, and 322 established via the access server 312. In some embodiments, the virtual communication channel between the client 304 and the application servers 318, 320, and 322 may be implemented by way of one or more network connections 326 between the client 304 and the access server 312, and one or more networks connections 326 between the access server 312 and each of the application servers 318, 320, and 322. Alternatively, in some embodiments, the virtual communication channel between the client 304 and the application servers 318, 320, and 322 may be implemented by the access server 312 mediating one or more network connections 326 directly between the client 304 and each of the application servers 318, 320, and 322.

Once established, the virtual communication channel 328 enables data flow over the network connections 326 between the client 304 and the access server 312, and data flow between the client 304 and the application servers 318, 320, and 322 via the access server 312. Through such the data flows, the client 304 may, for example, be serviced by the access server 312 (e.g., in accordance with the access server module 204 described in FIG. 2A) or obtain access to application services provided by each of the application servers 318, 320, and 322 (via the access server 312).

Figure 4:
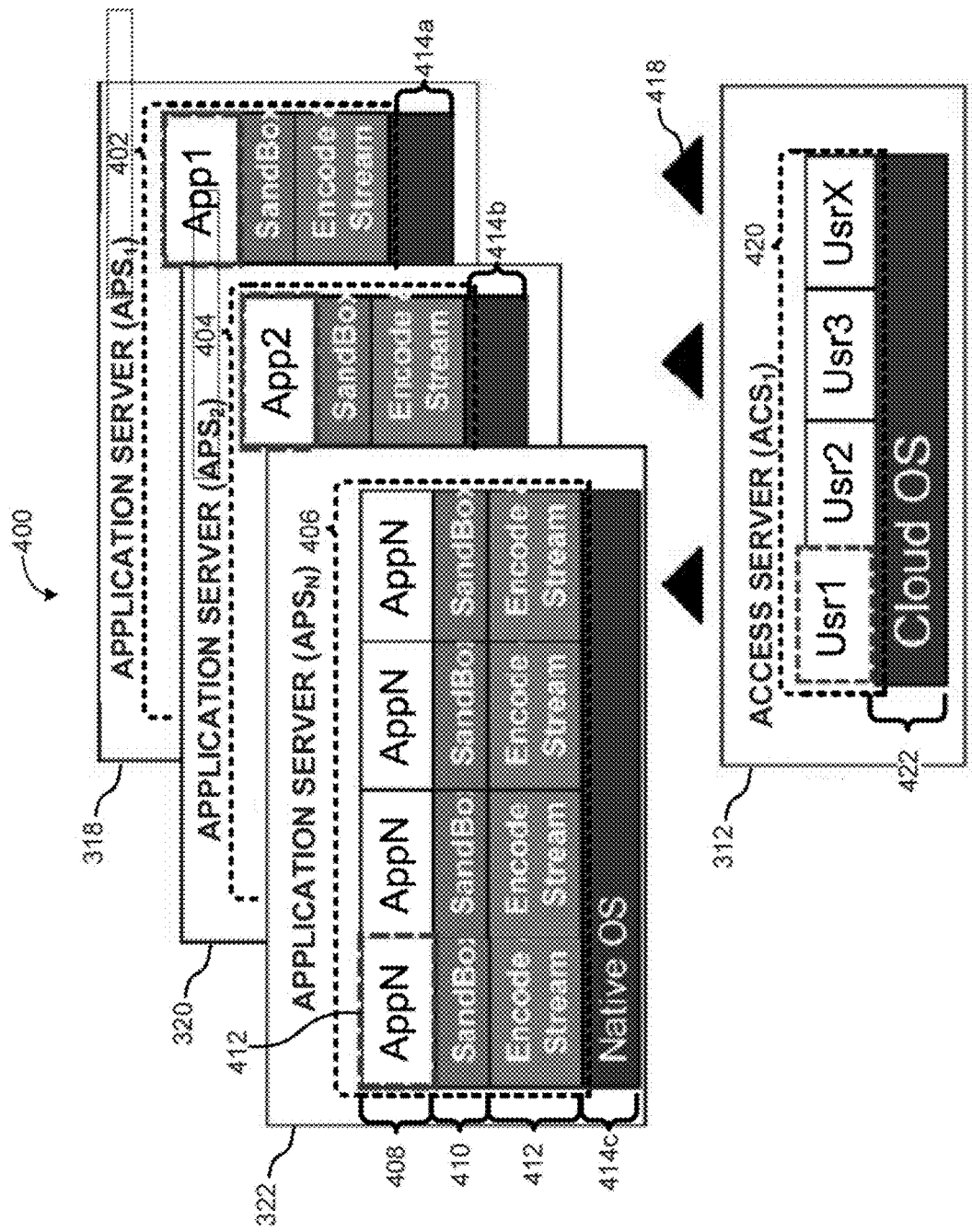
FIG. 4 is a block diagram illustrating an exemplary logical construct for an exemplary system for providing application access in accordance with various embodiments.

FIG. 4 is a block diagram illustrating an exemplary logical construct 400 for an exemplary system for providing application access in accordance with various embodiments. The structure and functionality represented by the exemplary logical construct 400 may be implemented by any number of embodiments described herein, including those of FIG. 1, 2 or 3. For example, as shown in FIG. 4, the exemplary logical construct 400 may be implemented using the APSs 318, 320 and 322 of the ASP system 310 described in reference to FIG. 3, and implemented using the ACS 312 of the ASP system 310 described in reference to FIG. 3.

The exemplary logical construct 400 illustrates how each of the APSs 318, 320, and 322 may respectively comprise a set of virtualized application instances (402, 404, 406), and a native operating system (414a, 414b, 414c) configured to support operation of the respective set (402, 404, 406). Additionally, the exemplary logical construct 400 further illustrates how each of the sets 402, 404, and 406 of virtualized application instances may comprise a virtualized application instance 412, which may be executing a version of an application (represented as application layer 408) at the request or control of an ASP system (e.g., the ASP system 310 in FIG. 3). In accordance with some embodiments, the application layer 408 may be executing in a (computer) sandbox (represented as sandbox layer 410 under the application layer 408), which may be configured to separate computing resources (e.g., on a physical computer or a virtual machine) utilized in performing the version of the application 408 (e.g., memory, processor, etc.) from versions of applications performing in other virtualized application instances a given APS (e.g., from other virtualized application instances operating in the set 406 of the APS 422). Depending on the embodiment, a separate sandbox may be utilized for each application session containing a virtualized application instance, or a separate sandbox may support multiple application sessions (i.e., multiple virtualized application instances) in association with a single user. The output from the application layer 408 executing on the sandbox layer 410 may result in output (e.g., video, audio, or other data) that is encoded and streamed (e.g., as one or more data streams) to a user (e.g., one a set of users 318 on ACS 312) via an encode and stream layer 412 (which may be implemented by the encoder module 214 and the streaming module 216 described with reference to FIG. 3).

In some embodiments, each of the native operating systems 414a, 414b, and 414c and the sets 402, 404, and 406 of virtualized application instances may be implemented using a cloud-based service, such as a platform cloud-based service (e.g., PaaS) or infrastructure cloud-based service (e.g., IaaS).

The exemplary logical construct 400 also illustrates how through connections 418 the ACS 312 services the set of user 318 using the APSs 318, 320, and 322. To facilitate user access to the one or more applications provided by the APSs 318, 320, and 322, the ACS 312 may be configured with a cloud-on operating system 422 configured to perform the functionalities similar to those described with respect to the access server module 204 in FIG. 2A.

Figure 5:
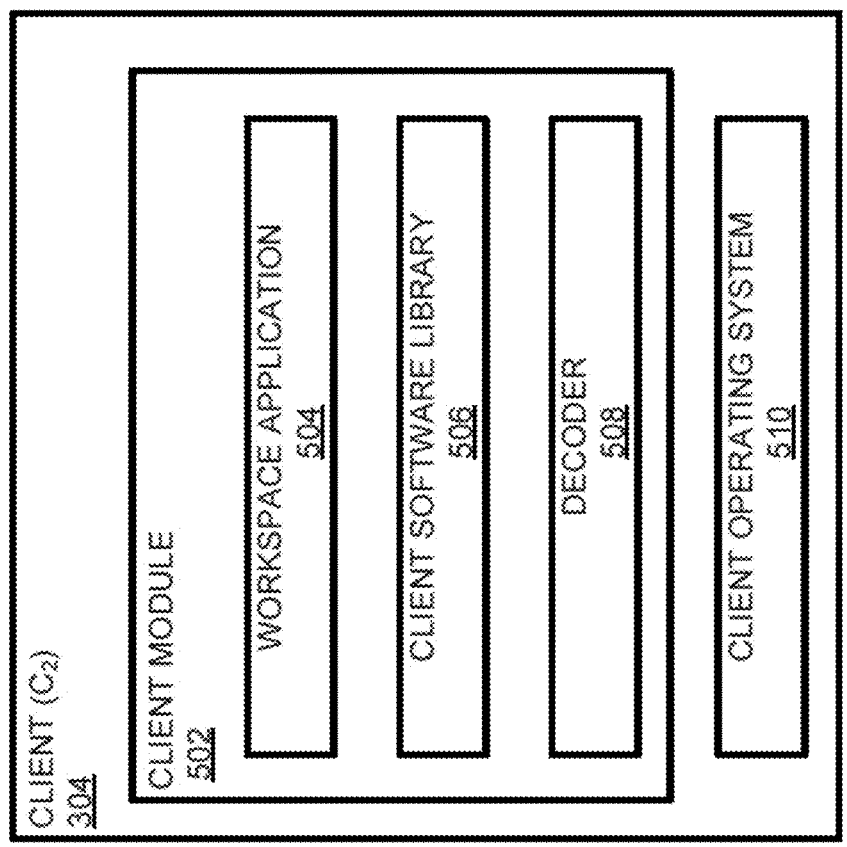
FIG. 5 is a block diagram illustrating an exemplary client configured to operate with an exemplary system for providing application access in accordance with various embodiments.

FIG. 5 is a block diagram illustrating an exemplary client, specifically the client 304, configured to operate with an exemplary system for providing application access in accordance with various embodiments. As shown, the client 304 comprises a client module 502 and a client operating system 510 operable in supporting operations by the client module 502 on the client 304. Depending on the embodiment, the client module 502 may be similar to the client module 202 described with respect to FIG. 2A, where the client module 502 may facilitate communication between the client 304 and an ASP system (e.g., the ASP system 310), provide a user at the client 304 with a client user interface configured to facilitate user interaction with an ASP system (e.g., the ASP system 310), relay user input received through the client user interface from the user at the client 304 to an ASP system (e.g., the ASP system 310), and relay output (e.g., video, audio, or other data) from an application provided by an ASP system (e.g., the ASP system 310) to one or more components of the client 304 configured to receive and present the output through the client user interface.

To implement such functionalities (and others), the client module 502 may comprise a workspace application 504 configured to present the client user interface to a user through a video display coupled to the client 304 (e.g., including generating or presenting a graphical user interface associated with the client user interface and handling the presentation of application output received from an ASP system), a client software library 506 configured to support various functionalities of the client module (e.g., support the functions of the workspace application 304 or the decoder 508), and the decoder 508 configured to decode encoded output data (e.g., video, audio, or other data) received from an ASP system (e.g., the ASP system 310) and provide the decoded output data (e.g., to the workspace application 504) for presentation to the user of the client 304 (e.g., video output data routed to the video display of the client 304, and audio data routed to the sound processor of the client 304). In some embodiments, the workspace application 504 may be a runtime application natively compatible with the operating system 510 of the client 304. Accordingly, for some embodiments, the wrapper application 504 is a native application of the client 304. Additionally, the workspace application 504 may be configured to provide access to applications that may be incompatible with the operation system 510 of the client 304 or that may otherwise not be operable on the client 304 without the use of the workspace application 504.

The workspace application 504 may also be configured to provide universal and/or agnostic file management access to various files that are stored at separate and disparate data storage services but made available through an ASP system (e.g., the ASP system 310). Accordingly, in some embodiments, the workspace application 504 may comprise a file management interface adapted to user requests for file management operations, such as adding (e.g., by creation of a new file or by upload), deleting, moving, and renaming files. For some embodiments, the workspace application 504 may utilize web-based application programming interfaces (APIs), which may be associated with one or more web applications (e.g., Google® Docs), to access files stored on cloud-based services. For example, in order to list files accessible through the ASP system (e.g., the ASP system 310), the workspace application 504 may utilize web-based APIs for a given cloud-based service (e.g., Dropbox, Box, or Google® Docs) to directly perform file management operations (e.g., listing of stored files, adding files, deleting files, or renaming files) with respect to that service. Then, when a file listed through the workspace application 504 is selected for opening through the ASP system (e.g., using a virtualized application instance provided through the ASP system 310), the workspace application 504 may instruct the ASP system to obtain a copy to the selected file from it respective storage source (e.g., cloud-based storage source or local storage source) or directly access the file from its respective storage source. Thereafter, the ASP system may initiate a virtualized application instance having access to the selected file, and the output data of the virtualized application instance may be transmitted to the client 304.

Figure 6:
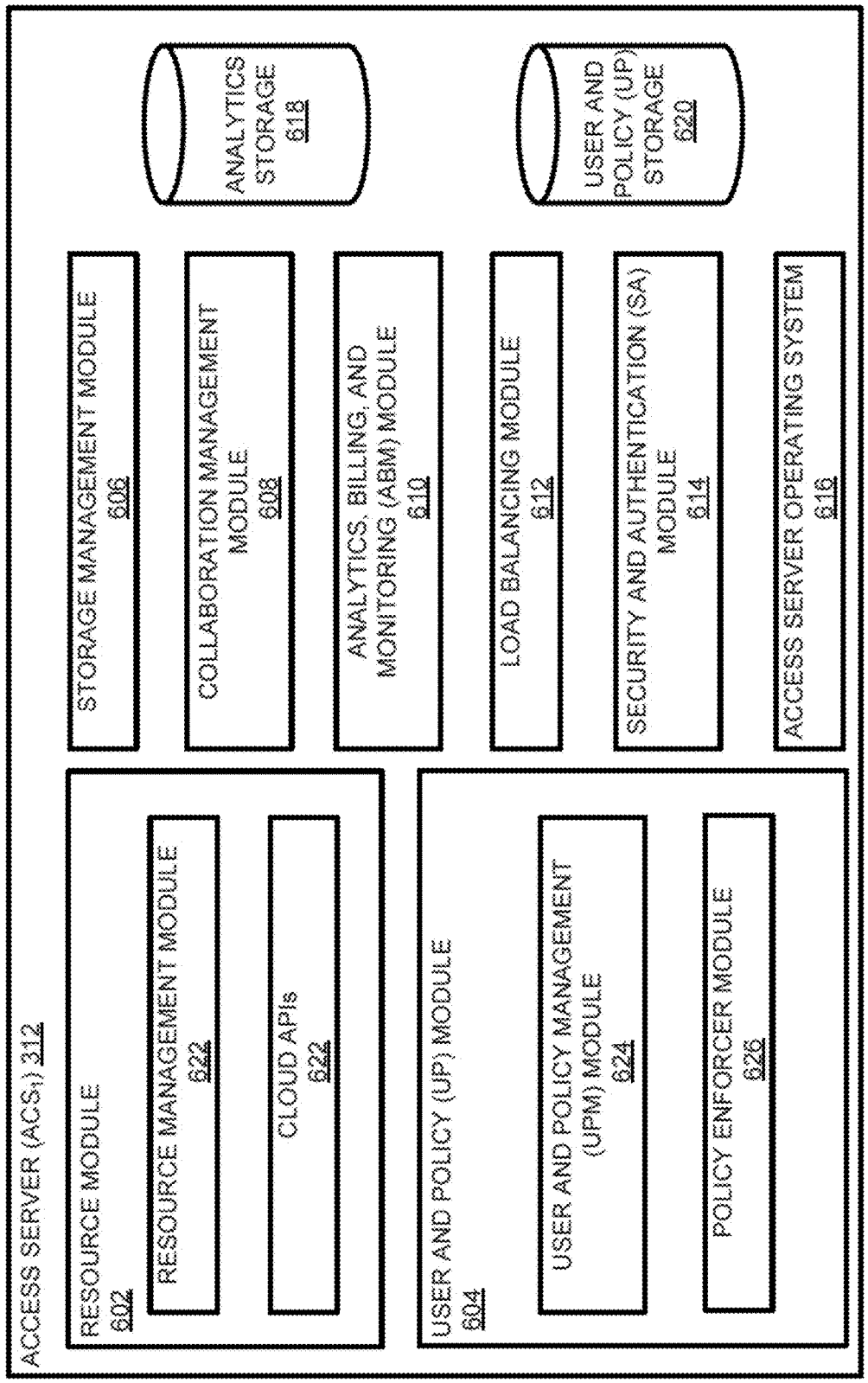
FIG. 6 is a block diagram illustrating an exemplary access server that is part of an exemplary system for providing application access in accordance with various embodiments.

FIG. 6 is a block diagram illustrating an exemplary access server, specifically the access server (ACS) 312, which is part of an exemplary system for providing application access in accordance with various embodiments. As shown, the ACS 312 comprises a resource module 602, a user and policy (UP) module 604, a storage management module 606, a collaboration management module 608, an analytics, bill, and monitoring (ABM) module 610, a load balancing module 612, a security and authentication (SA) module 614, an access server operating system 616 (configured to support operations of the ACS 312 and its various components), an analytics storage 618, and a user and policy (UP) storage 620.

The resource module 602 may be configured manage resources in association with the access server 312 performing its various functions within the ASP system 310, which can include managing application servers (APSs) utilized by the ASP system 310 to provide clients (e.g., the client 304) with application access, or managing resources utilized by various components of the ACS 312. To this effect, the resource module 602 may comprise a resource management module 622 adapted to dynamically allocate, assign, and monitor resources that may be utilized by or otherwise associated with the ACS 312 or the ASP system 310 in general. Included in those resources may be cloud-based resources utilized by the ACS 312, other ACSs in the ASP system 310, APSs in the ASP system 310, or other components in the ASP system 310. In some embodiments, the management of cloud-based resources may be implemented through cloud application programming interfaces (APIs) 624, which may be comprised in the resource module 602. The cloud APIs 624 may include, for example, those provided by Amazon®, GoGrid®, or Rackspace® in connection with their respective cloud-based services.

The user and policy (UP) module 604 may be configured to perform various user-related operations in connection with the ASP system 310. For example, the UP module 604 may facilitate implementation of user preferences and settings, user policy enforcement, and user session management (e.g., sessions in which users generally access the ASP system 310, or in which users are provided with application access). In some embodiments, the UP module 604 may comprise a user and policy management (UPM) module 624 that, in connection with the ASP system 310, may enable a user (e.g., a regular user, a super user, or an administrator) to manage (e.g., add, remove, or modify) one or more user accounts, preferences, settings, or policies. Such user-related parameters may determine or facilitate a user's access to various applications and a user's access to various storage services (e.g., cloud-based and otherwise) in connection with the various applications available through the ASP system 310. The user accounts, preferences, settings, or policies may also include parameters used in establishing access to a cloud-based storage service by an application (e.g., virtualized application instance) provided through the ASP system 310 (e.g., by way of the ACS 312).

For some embodiments, the UPM module 624 may be configured to provide a web-based interface through which an owner, operator, or administrator of the ASP system 310 can perform operations supported by the UP module 604 (e.g., user account, preference, and settings management). In addition, the UP module 604 (e.g., through the UPM module 626) may further be configured to interface and communicate with a user or policy management tool, external to the ASP system 310, that is adapted to view/monitor, create, delete, modify, or provide (e.g., from a source external to the ASP system 310) user related accounts, preferences, settings, and policies used by the ASP system 310.

The user and policy (UP) storage 620 of the ACS 312 may be configured to store information relating to user account, preference, setting, or policy, which can be accessed or operated upon by the UP module 604.

The policy enforcer module 628 may be configured to implement and enforce user policy when a user is accessing the ASP system 310, particularly through the ACS 312. In order to accomplish policy enforcement, the policy enforcer module 612 may adapted to actively monitor a user's access of the ASP system 310 and validate actions performed by the user during the access against current The storage management module 606 may be configured to add, remove, modify, or manage connections between the ASP system 310 and various storage entities, which may include databases, cloud-based storage services, and/or traditional file servers (e.g., a private enterprise file server). For example, the storage management module 606 may assist in storage-related connections for the ASP system 310 by establishing storage-related connections between various APSs (e.g., the APS 318), which are operating virtualized application instances (for access by users of the ASP system 310), and a storage entity (e.g., a third-party, cloud-based storage service), which may be internal or external to the ASP system 310. The establishment could, for some embodiments, involve logging into the storage entity using third-party user credentials stored and provided (e.g., by the UP module 604) in association with a user accessing the ASP system 310.

In some embodiments where the storage entity is a cloud-based storage service, the storage management module 606 may utilize application program interfaces (APIs), such as those provided by a third-party offering the cloud-based storage service, to log into the cloud-based storage service and establish a storage connection between the storage service and a virtualized application instance. In various embodiments, the storage management module 606 allows various virtualized environments to access one or more remote cloud-based storage services or facilities. The storage may be access by different programs in any number of ways (e.g., through drive letters as if the cloud-based storage was merely another local data drive).

In addition, in some embodiments, where direct integration with a cloud-based storage service is not available (e.g., no APIs are available), the storage management module 606 may facilitate locally storing (e.g., locally caching) on the ASP system 310 (e.g., on the ACS 312 or an APS presently operating an virtualized application instance) files from the cloud-based storage service being accessed by a virtualized application instance, and then (when necessary) updating such files on the cloud-based storage service using the locally stored files and through less direct means (e.g., web-based upload through a scripted bot).

The collaboration management module 608 may be configured to enable collaborative access, by two or more users, to applications provided through the ASP system 310 and the storage entities natively accessible by the applications, such as third-party, cloud-base storage services (e.g., Dropbox, Box, or Google® Docs). Depending on the configuration of the embodiment, the collaboration features may be synchronous (e.g., based on concurrent access and control of the same virtualized application instance/application session by two or more users) or asynchronous (e.g., two or more users having access to the same data, such as files, but through disparate application sessions, typically accessed at different times).

The analytics, bill, and monitoring (ABM) module 610 may be configured to permit an owner, operator or administrator of the ASP system 310 to perform various functions relating to gathering statistics and generating analytics regarding operation of the ASP system 310, implementing a billing system for the ASP system 310, and to monitoring various operational aspects of the ASP system 310 and its associated components (e.g., associated ACSs 312, 314, and 316 and APSs 318, 320, and 322).

For some embodiments, the statistics gathered or the analytics generated may include information based on the overall operation of the ASP system 310, operation of the ACS 312 or its counterparts ACSs 314 and 318, one or more of the APSs 318, 320, and 322, or information relating to user usage of or user access (e.g., application or storage) through the ASP system 310. The information may pertain to performance or usage of various computing resources, including for instance memory (e.g., static or volatile), processing resources, networking resources (e.g., networking connections or equipment), and cloud-based resources (e.g., SaaS, PaaS, or IaaS, which may be privately operated or provided by a third-party vendor). The ABM module 610 may be configured to export the statistical/analytical information gathered or generated to external services or computer applications operable in analyzing or reporting on the information provided. The exportation process may between the ABM module 610 and an external service/computer application may be facilitated through an interface (e.g., API utilized by the service or application, or utilized by the ABM module 610).

In support of its statistical/analytical functions, the analytics storage 618 of the ACS 312 may be utilized in storing statistics gathered or analytics generated by the ABM module 610. Additionally, in certain embodiments, the analytics storage 618 may be utilized to store rules, programs, or scripts that determine what statistics are gathered by the ABM module 610 for the ASP system 310, or what analytics are generated by the ABM module 610 for the ASP system 310.

With respect to the billing system, the ABM module 610 may relating to implementing a billing system by which user access usage of the ASP system 310 can be tracked, reported on, or charged by the owner, operator or administrator of the ASP system 310. In various embodiments, the billing functionalities of the ABM module 610 may be performed according to a billing schedule/rates defined by the owner, operator or administrator in association with user utilization of application or storage access services provided by the ASP system 310. In embodiments where the ASP system 310 utilizes one or more third-party services in conjunction with performing its functionalities, the billing schedule/rates may be updated/dynamically adjusted (possibly in real-time) to account for a change in costs/expenses relating to those third-party services. For instance, where various functionalities of the ASP system 310 rely on cloud-based services (e.g., SaaS, PaaS, or IaaS) provided by a third-party, an adjustment in rate charged for such cloud-based services (which may be charged) may be automatically reflected in the billing schedule/rates applied by the ABM module 610 to a user's access through the ASP system 310. Depending on the embodiments, the rate adjustment to the billing schedule/rates may be according to the types of applications or storage services accessed through the ASP system 310 and how those types utilize the third-party services.

For some embodiments, the ABM module 610 may further be configured to interface and communicate with an external billing or accounting service or computer application configured to receive billing information from the ABM module 610. Such billing information may contain, for example, charges accrued by users accessing the ASP system 310 in generally or, possibly, only those charges accrued by users accessing the ASP system 310 through the ACS 312 in particular.

The load balancing module 612 may be configured to facilitate load balancing features with respect to the ACS 312. For some embodiments, the load balancing support may include enabling the ACS 312 to receive access server-related tasks/operations distributed by the ASP system 310 amongst the various ACSs (e.g., 312, 314, and 316), or enabling the ACS 312 to distribute application server-related tasks/operations amongst the various APSs (e.g., 318, 320, and 322).

The security and authentication (SA) module 614 may be configured to perform operations relating to user login or authentication for the ASP system 310. To perform such operations, the SA module 614 may (directly or indirectly) interface and communicate with an authentication mechanism internal to the ASP system 310 (not shown) or external to the ASP system 310, which may be maintained by a third-party (e.g., a private enterprise authentication system, possibly maintained by an organization with which the user is associated). For example, the SA module 614 may establish a (secure) connection with an Microsoft® Active Directory® server or other Lightweight Directory Access Protocol (LDAP)-compatible server, operated and maintained external to the ASP system 310 (e.g., within the user's enterprise network), in performing login or authentication operations. The SA module 614 may, for some embodiments, utilize a single-sign-on (SSO) mechanism, such as those known in the art, for user login or user authentication.

Figure 7:
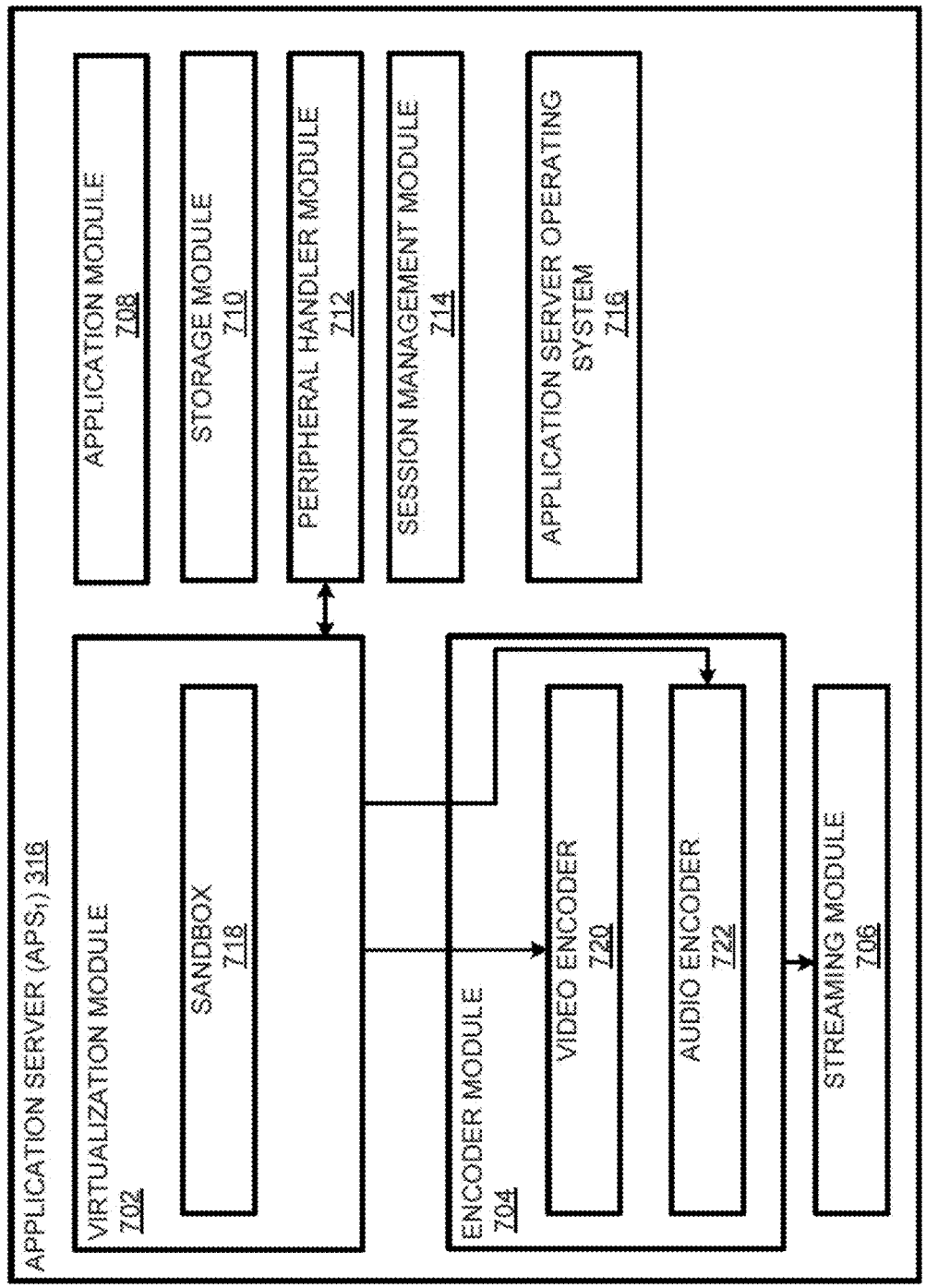
FIG. 7 is a block diagram illustrating an exemplary application server that is part of an exemplary system for providing application access in accordance with various embodiments.

FIG. 7 is a block diagram illustrating an exemplary application server, specifically the application server (APS) 318, which is part of an exemplary system for providing application access in accordance with various embodiments. As shown, the APS 318 comprises a virtualization module 702, an encoder module 704, a streaming module 706, an application module 708, a storage module 710, a peripheral handler module 712, a session management module 714, and an application server operating system 716 (configured to support operations of the APS 318 and its various components).

In some embodiments, the virtualization module 702 may be similar in operation or functionality to the virtualization module 208. Accordingly, the virtualization module 702 may be configured to establish, monitor, maintain, or otherwise manage execution of a virtualized application instance for the APS 318. As described herein, the virtualized application instance for the purpose of a user at client device accessing the virtualized application instance through the ASP system 310. As shown in FIG. 7, the virtualization module 702 may comprise a (computer) sandbox 704 that, in accordance with some embodiments, is configured to separate computing resources (e.g., memory, processor, input/output), of a (physical or virtual) computer system, utilized in performing virtualized application instances. In some instances, each virtualized application instance may be instantiated in a separate sandbox. In various embodiments, the sandbox 704 may be operating within the virtualization module 702 or, alternatively, be operating external to the virtualization module 702, the APS 318, or the ASP 310 (e.g., in a cloud-based service, such as an IaaS or PaaS) but under the control of the virtualization module 702 (e.g., via APIs).

In general, the computing environment implemented by the sandbox 704 may be configured to receive input data and transmit output data. Examples of input data to the sandbox 704 can include communications data (e.g., network data) or control information (e.g., produced by a human machine interface [HMI] device, such as a mouse or keyboard). Examples of output data from the sandbox 704 can include video data (e.g., data generally produced and outputted to a video display) or audio data (e.g., data generally produced and outputted to audio output device, such as speakers). For some embodiments, providing a user at a client 304 with access to a virtualized application instance operating in the sandbox 704 can comprise conveying input data or output data between the client 304 and the ASP system 310 and, more specifically, between the client module 502 operating on the client 304 and the virtualization module 702 of the APS 318.

Before conveying the output data from the virtualization module 702 (e.g., from the sandbox 704) to the client 304 (e.g., to the client module 502), some embodiments may utilize the encoder module 704 to encode the output data in a format capable of being decoded at the client 304. For some embodiments, the encoder module 704 may perform this encoding in accordance similar to the encoder module 214 described with respect to FIG. 2A.

As shown in FIG. 7, the encoder module 704 may specifically comprise a video encoder 720 configured to receive video output data from the virtualization module 702 (e.g., generated by the virtualized application instance operating in the sandbox 704) and encode that video output data to encoded video data. Additionally, the encoder module 704 may specifically comprise an audio encoder 722 configured to receive audio output data from the virtualization module 702 (e.g., generated by the virtualized application instance operating in the sandbox 704) and encode that video output data to encoded audio data.

As also shown in FIG. 7, the encoded (video or audio) data produced by the encoder module 704 may be provided to the streaming module 706 for delivery to the client 304 (e.g., to the client module 502), possibly as one or more data streams (e.g., each carrying a different type of data). For example, the streaming module 706 may receive encoded audio data and encoded video data from the encoder module 704 and generate a single data stream (i.e., containing both the audio and the data) that is subsequently delivered to the client module 502 of the client 304. The client module 502, in turn, may extract the encoded audio data and the encoded video data from the received data stream, and decode the data (e.g., using the decoder 508) for presentation to a client at the client 304 (e.g., through a client user interface generated by the wrapper application 504). In some embodiments, the operation or functionality of the streaming module 706 may be similar to of the streaming module 216 described in FIG. 2A.

The application module 708, for some embodiments, may be similar in operation or functionality to the application module 210 described in FIG. 2A. Accordingly, the application module 708 may be configured to obtain a version of an application (e.g., Microsoft® Excel®) from an application repository maintaining an application copy/image of that version (e.g., operating on a cloud-based server). Upon obtaining the version of the application, the application module 708 may provide the version to the virtualization module 702, either by reference (e.g., data path to the version) or as a copy, for instantiation as a virtualized application instance operating in the sandbox 704.

In some embodiments, the storage module 710, possibly in combination with the storage module 614, is similar in operation or functionality to the storage module 206 described in FIG. 2A. For example, the storage module 710 may be configured to operate in conjunction with the storage management module 606 of the ACS 312 to add, remove, modify, or manage connections between the ASP system 310, particularly the APS 318, and various storage entities, such as databases, cloud-based storage services, and traditional file servers (e.g., a private enterprise file server). According to some embodiments, the storage module 710 in combination with the storage management module 606 may establish a storage-related connections between a virtualized application instance operating in the virtualization module 702 (e.g., in the sandbox 704) and a third-party, cloud-based storage service (e.g., Dropbox, Box, or Google® Docs), which is generally external to the ASP system 310. As described herein, the establishment of a connection between the virtualized application instance and the third-party, cloud-based storage service may involve logging into the storage entity using third-party user credentials stored and provided (e.g., by the UP module 604) in association with a user accessing the virtualized application instance.

In various embodiments, the peripheral handler module 712 may be configured to handle input data received from a user at the client 304 (e.g., from the client module 502) and convey/redirect such input data to the virtualization module 702 (e.g., a virtualized application instance operating in the sandbox 704). As described herein, the input data may include, for example control information generated by a human machine interface (HMI) device, such as a mouse, keyboard, joystick, or touch screen. While conveying/redirecting the received input data, the peripheral handler module may translate the input data from a first input type, native to an environment of at least one of the client devices, to a second input type, native to an environment of the virtualized application instance. For some embodiments, the system may further comprise a peripheral handler module configured to redirect an output data received from the virtualized application instance to a peripheral coupled to at least one of the client devices.

For instance, where the control information received from the client 304 is fully or partially incompatible with the version of the application (e.g., Microsoft® Excel® 2011) operating in the virtualized application instance or incompatible with the operating system of the virtual computing environment in which the virtualized application instance is operating (e.g., Microsoft® Excel® 2011), the peripheral handle module 712 may be capable of translating, converting or remapping the control information from a first input data type that is native/compatible with the client 304 or with the operating system of the client 304 (e.g., Apple® iOS), to a second input data type that is native/compatible with the version of the application operating in the virtualized application instance or with operating system of the virtual computing environment in which the virtualized application instance is operating. Take for example where control information received from the client 304 (e.g., the client module 502) contains gestures entered on a touch screen at the client 304. Such control information, which may be native to/compatible to mobile devices (e.g., based on Android® or Apple® iOS), may be translated or remapped by the peripheral handler module 712 to mouse movements or keyboard inputs that, in the virtual computing environment of the virtualized application instance, equate to or are a substitute for the gestures originally entered at the client 304. Accordingly, for certain embodiments, the operation or functionality of the peripheral handle module 712 may include the operations or functionalities described with respect to the gesture module 212 of FIG. 2A.

In accordance with some embodiments, the session management module 714 may be configured to manage or monitor application sessions in association with virtualized application instances being operated by the virtualization module 702. In accordance with embodiments described herein, an application session may be generated for one or more virtualized application instances being accessed by a given user at the client 304. As such, the application session may be utilized by the ASP system 310 to associate one or more virtualized application instances with a given user accessing those virtualization application instances through the ASP system 310. In some embodiments, an application session may be established concurrently with (e.g., at or near the time of) the instantiation of the virtualized application instance associated with the session. Alternatively, an application may be established and associated with a virtualized application instantiation already operating in the virtualization module 702 (e.g., one that was initially started for another user during another application session, but has now been reset for the newly established application session associated with another user).

In addition to storing the association between a virtualized application instance and a given user, the application session maintained by the session management module 714 may periodically save the current state of the virtualized application instance as operated upon by the user. In doing so, the session management module 714 may preserve application sessions after a user at the client 304 has signed out of the ASP system 310 or the client 304 has lost network connection with the ASP system 310 (or the APS 318). For some embodiments, such a feature may permit the user at the client 304 to resume previous stared application sessions without the need to start with a new virtualized application instance in a new application session.

Figure 8:
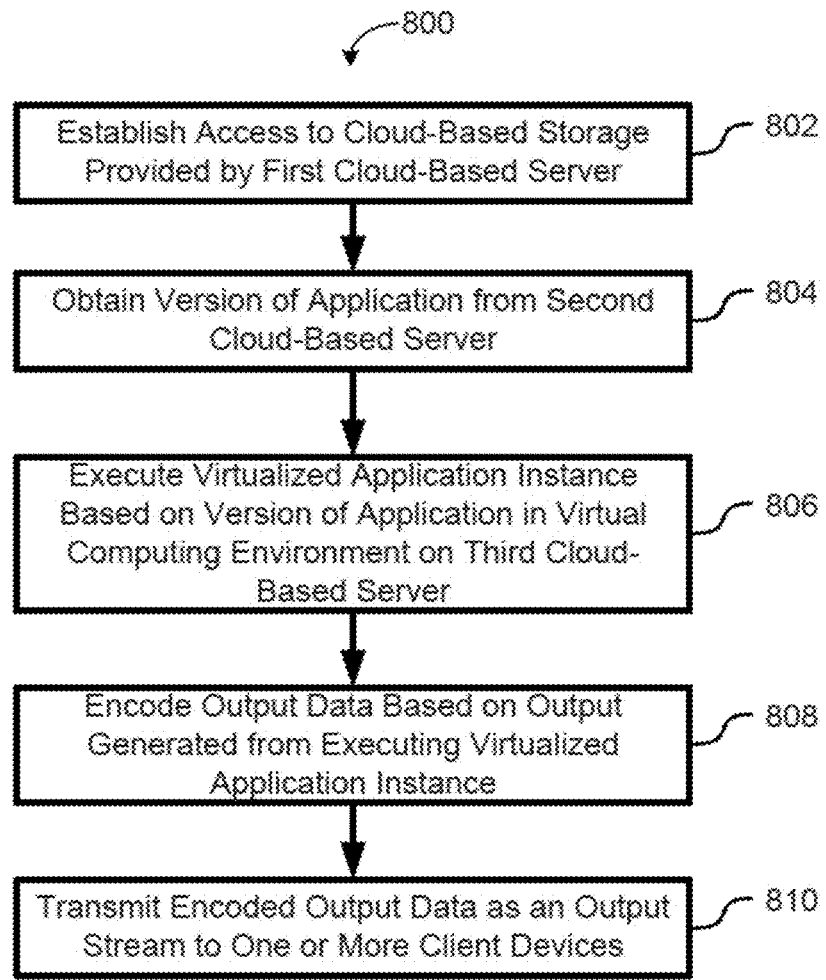
FIG. 8 is a flowchart illustrating an exemplary method for providing application access in accordance with various embodiments.

FIG. 8 is a flowchart 800 illustrating an exemplary method for providing application access in accordance with various embodiments. For some embodiments, the method presented by the flowchart 800 may be implemented using various components of the ASP system 104 of FIG. 2A, as described below. For example, the method may begin at step 802 with the access server module 204 establishing access to a cloud-based storage provided by a first cloud-based server (e.g., the cloud-based service server 110, which may be operated by a third party such as Dropbox, Box, or Google® Docs) over a network (e.g., network connection 112). In some embodiments, the access with the cloud-based storage is established using access parameters provided by a user at a client (e.g., the client 102) before or during step 802, or parameters stored on the ASP system 104 in association with the user at the client. Additionally, in establishing access to the cloud-based storage, the access server module 204 may employ various standard or proprietary file system protocols, including those known to those skilled in the art (e.g., network file system protocols, such as Samba [SMB], Network File System [NFS], or Andrew File System [AFS]). Such file system protocols may support data (e.g., file) access connections between the ASP system 104 (e.g., the access server module 204, the virtualization module 208, or the application module 210), through which a virtualized application instance can then access data.

At step 804, the application module 210 may obtain a version of an application (e.g., Microsoft® Excel®) from a second cloud-based server (e.g., an application repository). At step 806, the virtualization module 208 may execute a virtualized application instance based on the version of the application obtained at step 804, in a virtual computing environment (e.g., using a cloud-based service, such as SaaS, IaaS, or PaaS). In various embodiments, the virtualized application instance may be executed such that the virtualized application instance has native/direct access to data stored on/made available through the cloud-based storage with which access is established at step 802. Each virtualization may be performed in a sandbox.

As the virtualized application instance is executed, at step 808, the encoder module 214 may receive output data (e.g., video, audio, or other data) from the executing virtualized application instance (e.g., video output from a video editing application executing in the virtualized application instance) and encode the received output data in a format compatible for decoding by the client module 202 (e.g., as or once the encoded output data is delivered from the ASP system 104 to the client 102).

The output data encoded by the encoder module 214 at step 808 may be delivered by the ASP system 104 to the client 102 for decoding and presentation (e.g., through the client user interface). In some embodiments, the encoded output data from the encoder module 214 may be delivered to the client 102 at step 810 as a data stream generated by the streaming module 216. Depending on the embodiment, the data stream delivered may be such that the client 102 can extract and decode the encoded output data contained in the stream (e.g., using the client module 202). Additionally, for some embodiments, the streaming module 216 may generate the data stream such that the data stream comprises two or more individual data containing different data types. For example, an audio data stream generated by the streaming module contains may contain encoded audio output data from the virtualized application instance executing on the ASP system 104 on behalf of a client at the client 102.

Though the steps of the above method may be depicted and described in a certain order, those skilled in the art will appreciate that the order in which the steps are performed may vary between embodiments. Additionally, those skilled in the art will appreciate that the components described above with respect to the method of the flowchart 800 are merely examples of components that may be used with the method, and that other components may also be utilized in some embodiments.

FIGS. 9-12 provide screenshots 900, 1000, 1100, and 1200 of an exemplary client user interface configured to interact with an exemplary system for providing application access in accordance with various embodiments. As noted herein, the exemplary client user interface presented by the screenshots 900, 1000, 1100, and 1200 may be an interface generated or otherwise provided by a client module (e.g., the client module 202 of FIG. 2A) operating on a client (e.g., tablet computer, or mobile phone), accessible to a user, and configured to allow the user to select and open files or applications made available to them through the exemplary system (e.g., the ASP system 104 of FIG. 1).

Figure 9:
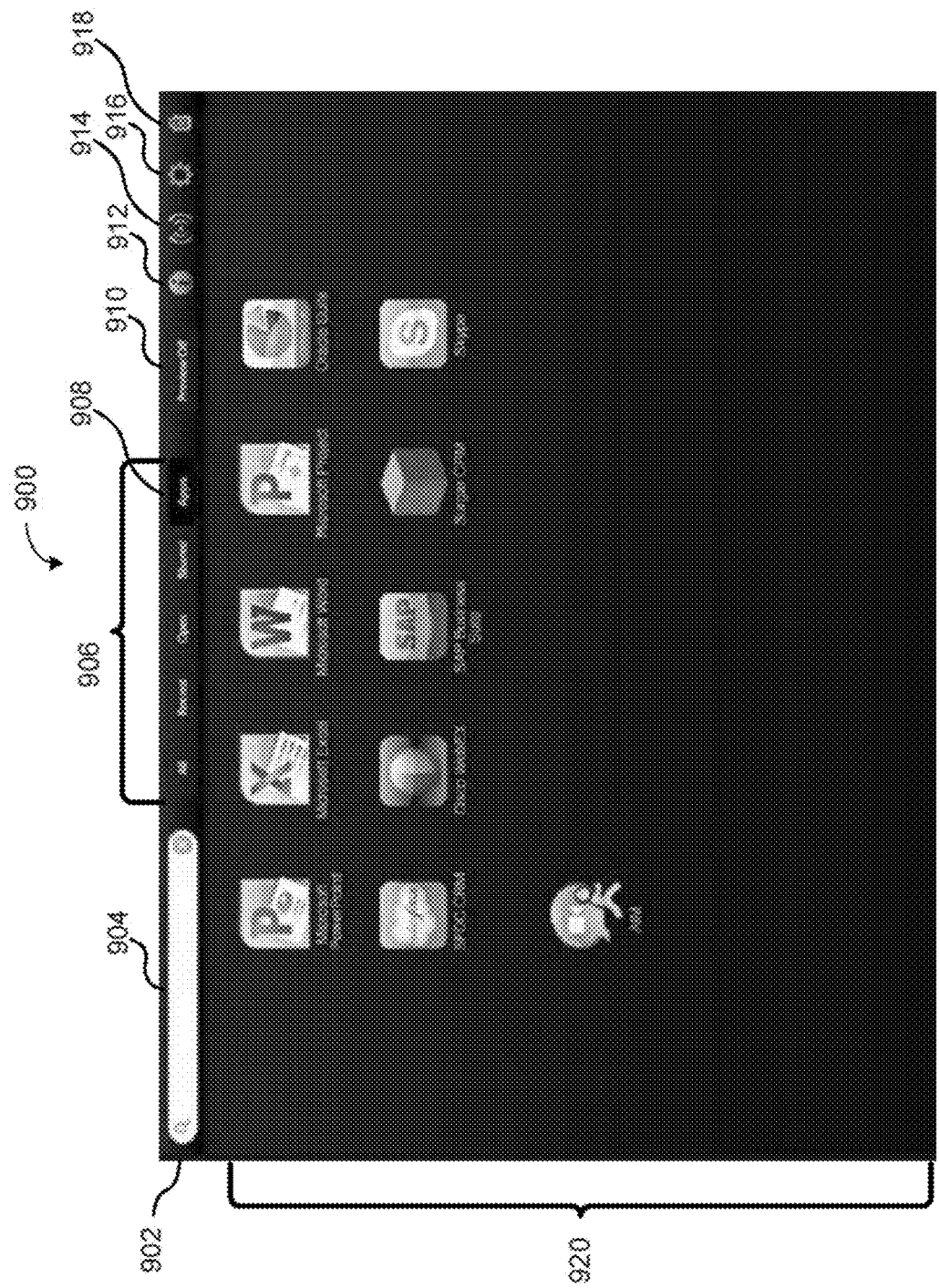
FIGS. 9-12 provide screenshots of an exemplary client user interface configured to interact with an exemplary system for providing application access in accordance with various embodiments.

In FIG. 9, the screenshot 900 presents the exemplary client user interface configured in an application-view mode, where the exemplary client user interface presents a listing of the applications (e.g., listing of icons representing applications) provided by the exemplary system (e.g., the ASP system 104 of FIG. 1) for access (e.g., selection and invocation, or for previewing the listing) by a user using the exemplary client user interface. As shown in the screenshot 900, the exemplary client user interface includes a function bar 902 at top of the interface, which may be configured to provide a user with menu selections, option selections, and search capabilities, and a viewing pane 920, which may be configured to present a listing of items (e.g., listing of files or listing of applications available through the exemplary client user interface) in accordance with user selections made through function bar 902.

The shown application icons may indicate different applications that are available to the user. Each application may be initiated within one or more virtualizations. In some embodiments, each application has a separate virtualization. The virtualization may be performed by the ASP 104, ACS 312, APS 318, or the like.

To facilitate the user interaction with the exemplary client user interface and more particularly the function bar 902 of the interface, the function bar 902 may comprise a search field 904 by which a user can textually search for files or applications accessible to the user through the exemplary client user interface. The function bar 902 may also comprise a view-mode selection bar 906 by which a user can select the toggle between different viewing modes for the viewing pane 920 (e.g., an application-view mode, where applications accessible to the user are listed in the viewing pane 920, or a file-view mode where files accessible to the user are listed in the viewing pane 920). For example, the view-mode selection bar 906 may allow a user to select between viewing, in the viewing pane 920, a listing of all accessible files, a listing of files recently access by the user, a listing of files currently open, a listing of files shared with other users (e.g., via the collaboration module 608), or a listing of applications available for access (e.g., by a user selecting an application toggle button 908). For some embodiments, the function bar 902 may provide a preview toggle button 910, which may be selected by a user to enable or disable a file preview feature of the viewing pane 920. Through use of the preview feature, a file may be displayed through the viewing pane 920 as read-only, possibly for presentation purposes (e.g., slide show) or for providing a quick preview of the file before it is opened for editing.

When a user wishes to view or change their account information (e.g., username, password, payment method, balance, e-mail address, etc.), they may select an account information button 912 that may be included on the function bar 902. Likewise, when a user wishes to share (or collaborate on) a listed item in the viewing pane 920 (e.g., file or application) with another user (e.g., a sharing user), the user may select a share button 914 included on the function bar 902, which may cause a share/collaboration menu to be provided by the exemplary client user interface.

As discussed herein, through a share/collaboration menu, some embodiments permit a user to grant one or more other online or offline users of an ASP system (e.g., the ASP system 104) share access to the particular virtualized application instance currently operating in the viewing pane 920 (or, alternatively, one already operating in the background for the user but not presently shown in the viewing pane 920), share access to the file currently being accessed through the particular virtualized application instance. For some embodiments, a user may implement limitations on the share access they authorize for other users, including an expiration time associated with the share grant and the type of share access to be granted (e.g., asynchronous share access, synchronous share access, password-protected access, or read-only access). Additionally, in some embodiments, the share/collaboration menu may permit the current user to receive from another user (of the ASP system) a request for share access and the type of share access that the current user may approve or deny, to view history relating to access of a shared file or application by other users, or to monitor the shared access of a file or application by other users.

In order to configure the settings of either the exemplary client user interface, the client module providing the exemplary client user interface (e.g., the client module 202 of FIG. 2A), or the exemplary system operating in conjunction with the exemplary client user interface (e.g., the ASP system 104 of FIG. 1), a user may select a configuration button 916 on the function bar 902. Deleting a listed item (e.g., accessible file or application) from the viewing pane 920 may be facilitated by a user selecting the listed item in the viewing pane 902 and then selecting a delete item button 918. Depending on the embodiment, deleting an item from the viewing pane 920 may result in removing access to the item, removing the item from storage on the exemplary system (e.g., the ASP system 104 of FIG. 1), or both.

The viewing pane 920 may present a listing of items, such as applications or files, available by the exemplary system for access or selection by the user. By way of example, where the exemplary client user interface is presented through a tablet computing device operating as a client, a user may invoke one or more of the applications listed by the exemplary client user interface by utilizing the input means provided by the tablet computing device (e.g., touch screen interface, keyboard, or stylus). Depending on the embodiment, the exemplary client user interface may be configured such that the applications are listed for selection according to application availability to users utilizing the exemplary client user interface. Examples of application availability can include availability based on the privileges of the current user logged into the client user interface, availability based on resources presently available to the exemplary system (e.g., computing resources or connection bandwidth), or some combination thereof. In some embodiments, the exemplary client user interface may list both available applications and unavailable application, with each listed being presented according to their availability. For example, where icons are employed in the viewing pane 920 to list applications, icons representing applications unavailable for selection by the user may be dithered (or otherwise visually modified) in comparison to icons representing applications available for selection by the user.

The screenshot 1000 of FIG. 10 presents the exemplary client user interface with the viewing pane 920 configured in a file-view/file management mode. In particular, the screenshot 1000 shows that through the view-mode selection bar 906, a user has chosen a file management mode where all files accessible to the user are listed in the viewing pane 920. For some embodiments, access to files through the viewing pane 920 while in file management mode may comprise selecting (e.g., for opening in a virtualized application instance), adding (e.g., by creation of a new file or by upload), deleting, moving, and renaming files. As described herein, the file presented in the viewing pane 920 may be those from one or more third-party cloud-based storage services. In file management mode, the viewing pane 920 may be configured to present files in a common manner, regardless of their respective cloud-based sources. In this way, various embodiments may present the files to a user for access in a universal and agnostic manner, independent of what application is needed to open the file (e.g., version of application) or where the file is stored.

The screenshot 1000 also shows that the user has enabled file preview mode via the preview toggle button 910, whereby the exemplary client user interface may provide a preview of a select file listed in the viewing pane 920 upon user's selection of the file. Such a preview is not shown in FIG. 10.

Figure 11:
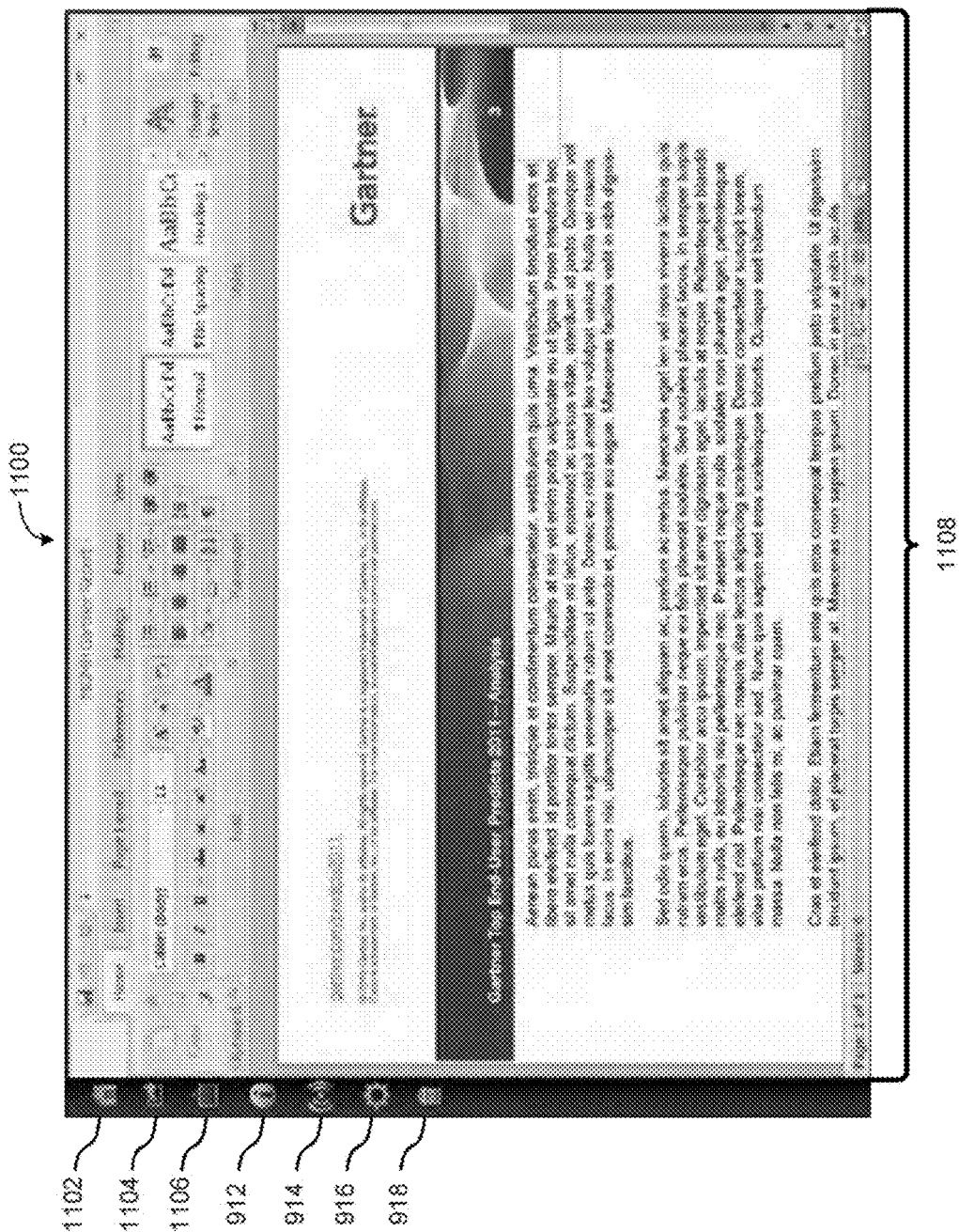

The screenshot 1100 of FIG. 11 presents the exemplary client user interface after selection of a file or an application through the exemplary client user interface. The screenshot 1100 specifically shows what the exemplary client user interface may appear as after a word processing file (e.g., Microsoft® Word® file) or an application (e.g., Microsoft® Word®) listed in the viewing pane 920 has been selected by a user through the exemplary client user interface. For some embodiments, when a user selects a file through the exemplary client user interface (e.g., via the viewing pane 920), an application compatible with file (e.g., compatible with the format of the file) and provided by the exemplary system (e.g., the ASP system 104 of FIG. 1) may be invoked to open or operate on the file.

As shown in the screenshot 1100, after a file or application has been selected, the exemplary client user interface may comprise: a home button 1102, which may be configured to return a user to the exemplary client user interface of FIG. 9 or FIG. 10 upon selection; an open button 1104, which may be configured to open one or more files (in addition to the currently shown file) using the application currently active and displayed through the exemplary client user interface or through another application (e.g. one already active in the background or newly invoked for the purpose of the other file); a maximize/minimize/window control button 1106, which may be configured to control a size of the window interface and an active application viewing pane 1108, through which the currently active application may be displayed (e.g., the display output for the application). Generally, the currently active application is the application a user has currently chosen to use through the exemplary client user interface. In some embodiments, the open button 1104 may cause the exemplary user interface to present a listing of files available for opening through the application currently active and displayed through the exemplary client user interface, or through another application available through the an APS system (e.g., the ASP system 104). The files listed may include those provided by a cloud-based service having a connection established with the APS system (e.g., the ASP system 104).

As also shown in the screenshot 1100, the exemplary client user interface may further provide the account information button 912, the share button 914, the configuration button 916, and the delete item button 918 described in FIG. 9. In the context of FIG. 11, the delete item button 918 may be configured to delete the currently active application or the current file being operated on by the currently active application). An application viewing pane 908 displays video output data from the active application currently being provided to the user through the exemplary client user interface.

Figure 12:
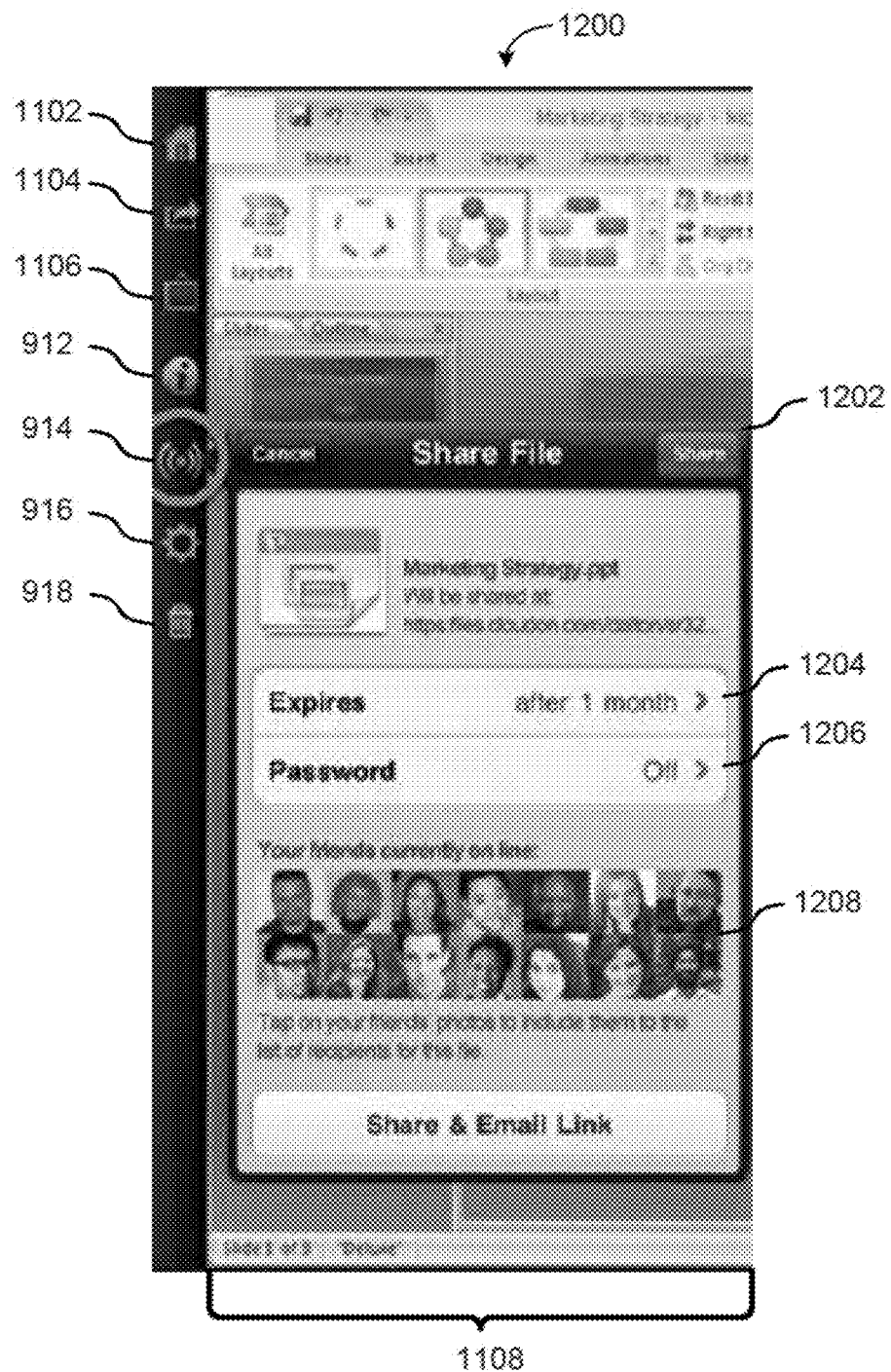

The screenshot 1200 of FIG. 12 presents a close up of the exemplary client user interface upon selection of the share button 914. As shown in the screenshot 1200, once a user selects the share button 914, a share dialog box 1202 may be presented (e.g., over the active application viewing pane 1108) to configure the share. Through an expiration field 1204, the share dialog box 1202 may permit a user to specify when a share (e.g., with one or more other user on the exemplary application service provider system 104 of FIG. 1) will expire (e.g., by hours, days, months, or a specific date). The share dialog box 1202 may also permit a user to enable or disable a password for the share (e.g., where a sharing user is prompted with a password before being granted access to the shared file or application). A share user selection menu 1208 in the share dialog box 1202 may facilitate a user's selection of one or more sharing users with which a select file or application will be shared. For some embodiments, the share may be delivered by way of electronic mail (e-mail) or text message system, possibly internal or external to the exemplary system. In the context of the screenshot 1200, the share to be created by the user may be for the current file or currently active application being presented in the active application viewing pane 1108.

Figure 13:
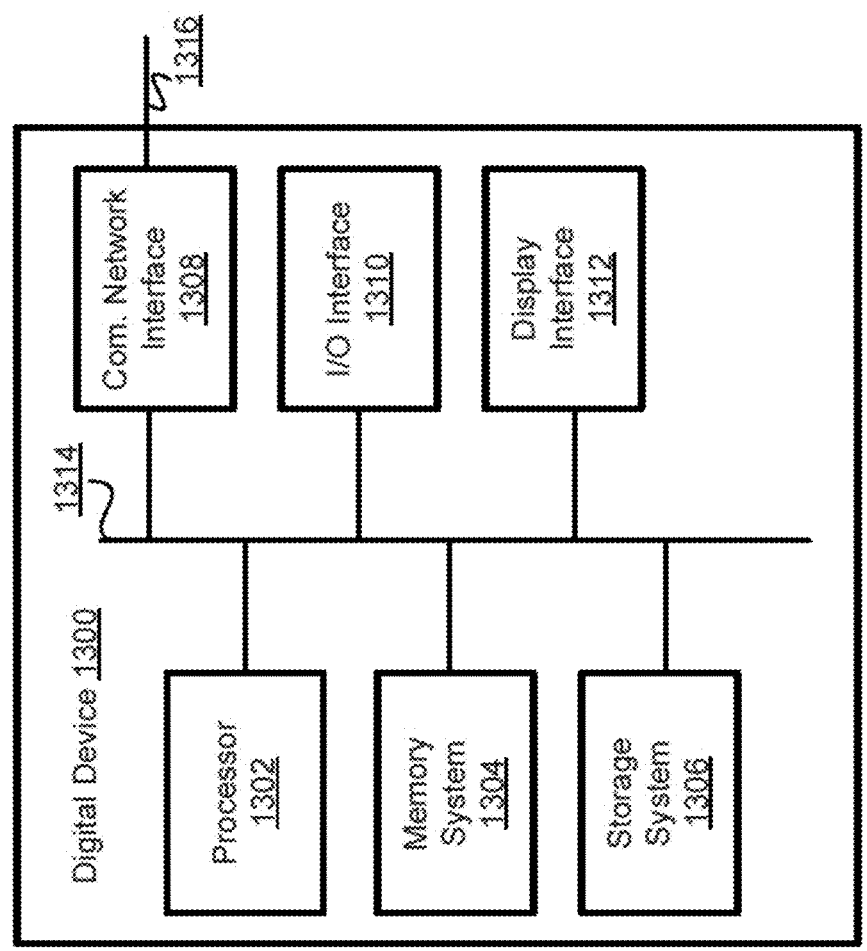
FIG. 13 is a block diagram illustrating an exemplary digital device that can be utilized in the implementation of various embodiments.

FIG. 13 is a block diagram of an exemplary digital device 1300. The digital device 1300 comprises a processor 1302, a memory system 1304, a storage system 1306, a communication network interface 1308, an I/O interface 1310, and a display interface 1312 communicatively coupled to a bus 1314. The processor 1302 is configured to execute executable instructions (e.g., programs). In some embodiments, the processor 1302 comprises circuitry or any processor capable of processing the executable instructions.

The memory system 1304 is any memory configured to store data. Some examples of the memory system 1304 are storage devices, such as RAM or ROM. The memory system 1304 can comprise the ram cache. In various embodiments, data is stored within the memory system 1304. The data within the memory system 1304 may be cleared or ultimately transferred to the storage system 1306.

The storage system 1306 is any storage configured to retrieve and store data. Some examples of the storage system 1306 are flash drives, hard drives, optical drives, and/or magnetic tape. In some embodiments, the digital device 1300 includes a memory system 1304 in the form of RAM and a storage system 1306 in the form of flash data. Both the memory system 1304 and the storage system 1306 comprise computer readable media which may store instructions or programs that are executable by a computer processor including the processor 1302.

The communication network interface (com. network interface) 1308 can be coupled to a network (e.g., network 324) via the link 1316. The communication network interface 1308 may support communication over an Ethernet connection, a serial connection, a parallel connection, or an ATA connection, for example. The communication network interface 1308 may also support wireless communication (e.g., 802.11 a/b/g/n, WiMax). It will be apparent to those skilled in the art that the communication network interface 1308 can support many wired and wireless standards.

The optional input/output (I/O) interface 1310 is any device that receives input from the user and output data. The optional display interface 1312 is any device that is configured to output graphics and data to a display. In one example, the display interface 1312 is a graphics adapter.

It will be appreciated by those skilled in the art that the hardware elements of the digital device 1300 are not limited to those depicted in FIG. 13. A digital device 1300 may comprise more or less hardware elements than those depicted. Further, hardware elements may share functionality and still be within various embodiments described herein. In one example, encoding and/or decoding may be performed by the processor 1302 and/or a co-processor located on a GPU (i.e., Nvidia®).

The above-described functions and components can be comprised of instructions that are stored on a storage medium such as a computer readable medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with some embodiments. Those skilled in the art are familiar with instructions, processor(s), and storage medium.

Various embodiments are described herein as examples. It will be apparent to those skilled in the art that various modifications may be made and other embodiments can be used without departing from the broader scope of the invention(s) presented herein. These and other variations upon the exemplary embodiments are intended to be covered by the present invention(s).

What is claimed is:

1. A method, comprising:
    establishing, by a computing device of an application service provider system, access to cloud-based storage provided by a first cloud-based server over a network, the cloud-based storage comprising a file;
    receiving, by the computing device, from a client application on a remote client device a request for access to the file, the client application being native to an operating system of the remote client device;
    obtaining, by the computing device, a version of an editing application from a second cloud-based server based on one or more criteria, the one or more criteria including a network bandwidth between the application service provider system and the remote client device, wherein the version of the editing application is natively incompatible with the operating system of the client device, the version of the editing application being capable of processing the file, the version of the editing application being obtained from the second cloud-based server by an application module in response to the user's request from the remote client device for access to the file, wherein the editing application is obtained based on the user's request;
    executing, by a virtual machine on the computing device, a virtualized application instance in a virtual environment generated by the virtual machine, the virtualized application instance being based on the version of the editing application in a virtual computing environment, the virtualized application instance being configured to receive access to the file on the cloud-based storage, the virtualized application instance being further configured to enable editing of the file in response to application controls;
    transmitting, by the computing device, to the remote client device output data generated as a result of execution of the virtualized application instance;
    receiving, by the computing device, first input data native to an environment of the remote client device and generated by a peripheral coupled to the remote client device;
    translating, by the computing device, the first input data to the application controls; and
    using, by the computing device, a second input data to control the execution of the virtualized application instance.

2. The method of claim 1, further comprising mapping access of the cloud-based storage from a storage module to the virtual computing environment, thereby providing the virtualized application instance access to the cloud-based storage.

3. The method of claim 1, wherein the output data comprises display data or audio data generated as the result of the execution of the virtualized application instance.

4. The method of claim 1, wherein establishing access to the cloud-based storage comprises establishing access to the cloud-based storage by a web-based application program interface (API) configured to perform file-based operations with the cloud-based storage.

5. The method of claim 1, further comprising redirecting the input data received from the peripheral to the virtualized application instance.

6. The method of claim 1, further comprising redirecting the output data received from the virtualized application instance to the remote client device.

7. The method of claim 1, further comprising generating a separate virtualized application instance for each user on the remote client device.

8. The method of claim 1, wherein each user on the remote client device is provided with a separate application instance.

9. The method of claim 1, further comprising:
    authenticating a user on the remote client device; and
    enabling access to the file in cloud-based storage using a user credential associated with the authenticated user.

10. The method of claim 1, further comprising:
    authenticating a user on the remote client device; and
    enabling access to an image of the editing application using a user credential associated with the authenticated user.

11. The method of claim 1, wherein the cloud-based storage is provided by a third-party cloud-based storage provider.

12. The method of claim 1, wherein an image of the editing application is provided by a third-party cloud-based application provider.

13. A non-transitory computer readable medium comprising executable instructions, the instructions executable by a processor of an application service provider system to perform a method, the method comprising:
    establishing access to cloud-based storage provided by a first cloud-based server over a network, the cloud-based storage comprising a file;
    receiving from a client application on a remote client device a request for access to the file, the client application being native to an operating system of the remote client device;
    obtaining a version of an editing application from a second cloud-based server based on one or more criteria, the one or more criteria including a network bandwidth between the application service provider system and the remote client device, wherein the version of the editing application is natively incompatible with the operating system of the client device, the version of the editing application being capable of processing the file, the version of the editing application being obtained from the second cloud-based server by an application module in response to the user's request from the remote client device for access to the file, wherein the editing application is obtained based on the user's request;
    executing, by a virtual machine, a virtualized application instance in a virtual environment generated by the virtual machine, the virtualized application instance being based on the version of the application in a virtual computing environment, the virtualized application instance being configured to receive access to the file on the cloud-based storage, the virtualized application instance being further configured to enable editing of the file in response to application controls;
transmitting to the remote client device output data generated as a result of execution of the virtualized application instance;
receiving first input data native to an environment of the remote client device and generated by a peripheral coupled to the remote client device;
translating the first input data to the application controls; and
using a second input data to control the execution of the virtualized application instance.

14. An application service provider system, comprising:
at least one processor;
means for establishing access to cloud-based storage provided by a first cloud-based server over a network, the cloud-based storage comprising a file;
means for receiving from a client application on a remote client device a request for access to the file, the client application being native to an operating system of the remote client device;
means for obtaining a version of an editing application from a second cloud-based server based on one or more criteria, the one or more criteria including a network bandwidth between the application service provider system and the remote client device, wherein the version of the editing application is natively incompatible with the operating system of the client device, the version of the editing application being capable of processing the file, the version of the editing application being obtained from the second cloud-based server by an application module in response to the user's request from the remote client device for access to the file, wherein the editing application is obtained based on the user's request;
means for executing, by a virtual machine, a virtualized application instance in a virtual environment generated by the virtual machine, the virtualized application instance being based on the version of the application in a virtual computing environment, the virtualized application instance being configured to receive access to the file on the cloud-based storage, the virtualized application instance being further configured to enable editing of the file in response to application controls;
means for transmitting to the remote client device output data generated as a result of execution of the virtualized application instance; and
means for receiving first input data native to an environment of the remote client device and generated by a peripheral coupled to the remote client device, and for translating the first input data to the application controls.

15. A system comprising:
one or more processors; and
a non-transitory computer readable medium that includes one or more sequences of instructions that, when executed by the one or more processors, cause the processors to perform operations comprising:
establishing, by a computing device of an application service provider system, access to cloud-based storage provided by a first cloud-based server over a network, the cloud-based storage comprising a file;
receiving, by the computing device, from a client application on a remote client device a request for access to the file, the client application being native to an operating system of the remote client device;
obtaining, by the computing device, a version of an editing application from a second cloud-based server based on one or more criteria, the one or more criteria including a network bandwidth between the application service provider system and the remote client device, wherein the version of the editing application is natively incompatible with the operating system of the client device, the version of the editing application being capable of processing the file, the version of the editing application being obtained from the second cloud-based server by an application module in response to the user's request from the remote client device for access to the file, wherein the editing application is obtained based on the user's request;
executing, by a virtual machine on the computing device, a virtualized application instance in a virtual environment generated by the virtual machine, the virtualized application instance being based on the version of the editing application in a virtual computing environment, the virtualized application instance being configured to receive access to the file on the cloud-based storage, the virtualized application instance being further configured to enable editing of the file in response to application controls;
transmitting, by the computing device, to the remote client device output data generated as a result of execution of the virtualized application instance;
receiving, by the computing device, first input data native to an environment of the remote client device and generated by a peripheral coupled to the remote client device;
translating, by the computing device, the first input data to the application controls; and
using, by the computing device, a second input data to control the execution of the virtualized application instance.

16. The system of claim 15, wherein the instructions cause the processors to perform operations comprising:
mapping access of the cloud-based storage from a storage module to the virtual computing environment, thereby providing the virtualized application instance access to the cloud-based storage.

17. The system of claim 15, wherein the output data comprises display data or audio data generated as the result of the execution of the virtualized application instance.

18. The system of claim 15, wherein the instructions that cause the processors to perform operations comprising establishing access to the cloud-based storage include instructions that cause establishing access to the cloud-based storage by a web-based application program interface (API) configured to perform file-based operations with the cloud-based storage.

19. The system of claim 15, wherein the instructions cause the processors to perform operations comprising:
redirecting the input data received from the peripheral to the virtualized application instance.

20. The system of claim 15, wherein the instructions cause the processors to perform operations comprising:
redirecting the output data received from the virtualized application instance to the remote client device.

21. The system of claim 15, wherein the instructions cause the processors to perform operations comprising:
generating a separate virtualized application instance for each user on the remote client device.

22. The system of claim 15, wherein each user on the remote client device is provided with a separate application instance.

23. The system of claim 15, wherein the instructions cause the processors to perform operations comprising:
   authenticating a user on the remote client device; and
   enabling access to the file in cloud-based storage using a user credential associated with the authenticated user.

24. The system of claim 15, wherein the instructions cause the processors to perform operations comprising:
   authenticating a user on the remote client device; and
   enabling access to an image of the editing application using a user credential associated with the authenticated user.

25. The system of claim 15, wherein the cloud-based storage is provided by a third-party cloud-based storage provider.

26. The system of claim 15, wherein an image of the editing application is provided by a third-party cloud-based application provider.

\* \* \* \* \*